United States Patent
Kim et al.

(10) Patent No.: US 12,208,331 B2
(45) Date of Patent: Jan. 28, 2025

(54) AUTOMATED WORKER SYSTEM FOR REAL-TIME STRATEGY GAME

(71) Applicant: Tencent America LLC, Palo Alto, CA (US)

(72) Inventors: Taeyeon Kim, Palo Alto, CA (US); Stefan Haines, Palo Alto, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 18/592,362

(22) Filed: Feb. 29, 2024

(65) Prior Publication Data

US 2024/0424397 A1    Dec. 26, 2024

Related U.S. Application Data

(60) Provisional application No. 63/523,311, filed on Jun. 26, 2023.

(51) Int. Cl.
A63F 13/56    (2014.01)
A63F 13/822    (2014.01)

(52) U.S. Cl.
CPC ............ *A63F 13/56* (2014.09); *A63F 13/822* (2014.09); *A63F 2300/638* (2013.01)

(58) Field of Classification Search
CPC ... A63F 13/56; A63F 13/822; A63F 2300/638
See application file for complete search history.

(56) References Cited

U.S. PATENT DOCUMENTS 9,511,280 B1 * 12/2016 Hawk .................... A63F 13/58
11,007,439 B1 * 5/2021 Pineda ................... A63F 13/847
2016/0008722 A1    1/2016 Berger et al.
2021/0220742 A1    7/2021 Yu
2022/0370917 A1    11/2022 Dong et al.
2023/0020032 A1    1/2023 Wang et al.
2023/0041183 A1    2/2023 Shi

FOREIGN PATENT DOCUMENTS

WO    2023056799 A1    4/2023

OTHER PUBLICATIONS

AOE2 manual (Year: 1999).*
AOE2 conquerors wiki (Year: 2000).*
AOE2 wiki resources (Year: 2020).*
Majesty Wiki (Year: 2000).*
International Search Report and Written Opinion issued in International Application No. PCT/US2024/018497, mailed on Jun. 10, 2024, 13 pages.

* cited by examiner

*Primary Examiner* — Thomas H Henry
(74) *Attorney, Agent, or Firm* — ArentFox Schiff LLP

(57) ABSTRACT

A method is provided for implementing an automated worker system. The method includes generating, at a first location in a virtual scene, a first set of virtual units of a user in the virtual scene, each of the first set of virtual units being configured to automatically collect at least one resource associated with the first location. The method further includes accumulating, for the user, the at least one resource collected by the first set of virtual units based on a number of the virtual units in the first set of virtual units and resource collection rates of the virtual units in the first set of virtual units. This allows players to focus on more exciting portions of an RTS game rather than perform repetitive and tedious tasks involved with controlling resource gathering units and resource management.

17 Claims, 13 Drawing Sheets

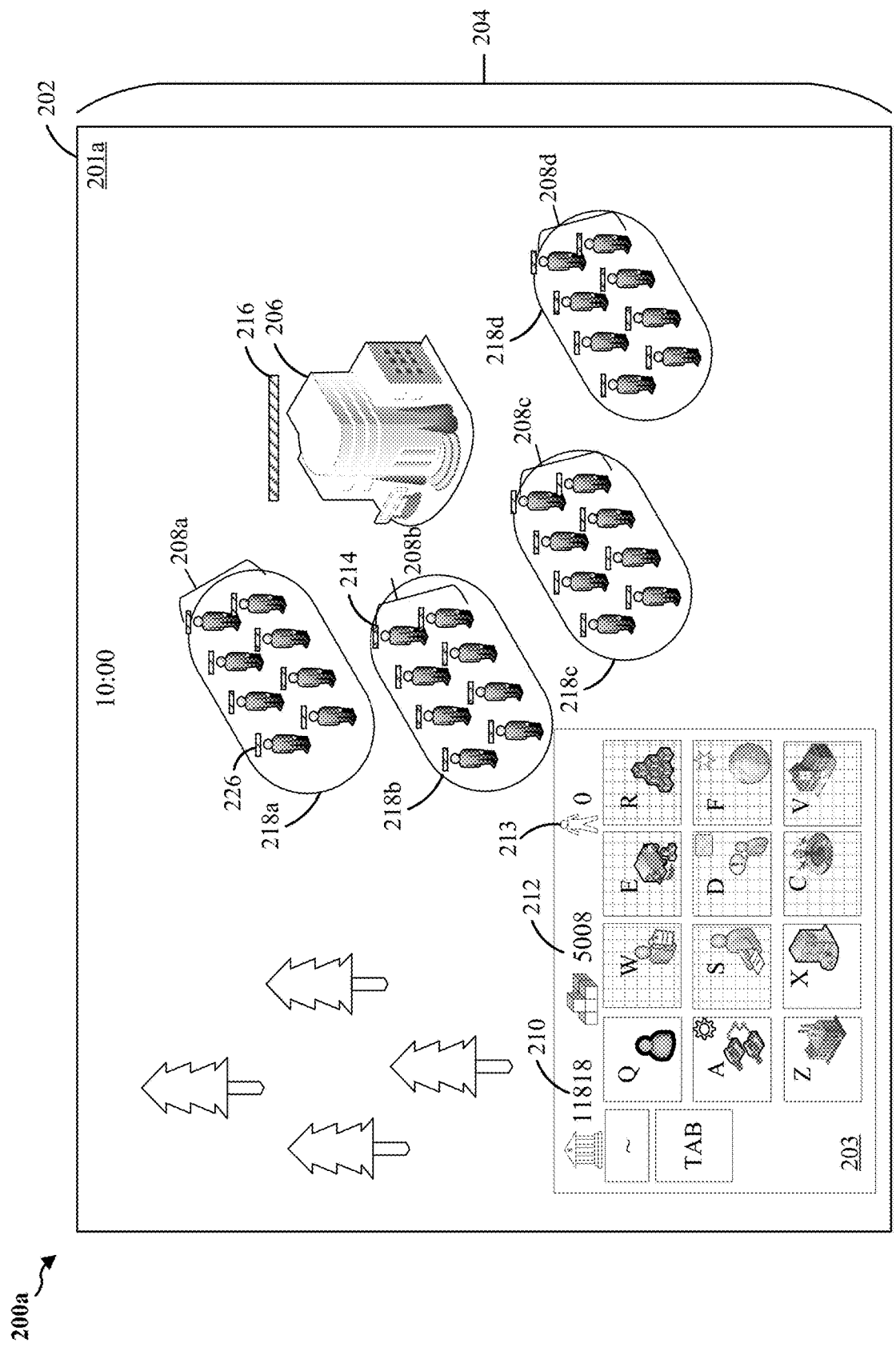

AUTOMATED WORKER SYSTEM FOR REAL-TIME STRATEGY GAME

CROSS-REFERENCE TO RELATED APPLICATION(S)

The present disclosure claims the benefit of U.S. Provisional Application No. 63/523,311, entitled "AUTOMATED WORKER SYSTEM FOR REAL-TIME STRATEGY GAME" and filed on Jun. 26, 2023, which is incorporated by reference herein in its entirety.

TECHNICAL FIELD

The present disclosure relates generally to providing an automated worker system for real-time strategy games and, more specifically, for providing an automated worker system that manages virtual units.

BACKGROUND

A computer game is an electronic game that involves human interaction with a user interface to generate visual and/or auditory feedback on a computing device. The computing device may be a general purpose computing device that is programmed to execute the computer game, a mobile device that is programmed to execute the computer game, or a special-purpose gaming machine or console.

Real-time strategy (RTS) is a genre of computer games that is similar to a war stimulation. In an RTS game, a player controls an army of units (e.g., soldiers, engineers, medics, tanks, ships, etc.) by issuing orders in real-time to gather resources, build an infrastructure, train units, generate buildings, upgrade units and buildings, and destroy an opponent's forces. In some RTS games, a player is able to view the war field from a bird's eye (top-down) perspective. The real-time aspect of RTS comes from the fact that players do not incrementally take turns. Instead, the players act simultaneously to position, command, and maneuver units and/or buildings under their control to win a game by destroying a core building (e.g., a command center), all buildings belonging to their opponent, or completing an objective. For example, since there are no incremental turns, a first player may build ten units in a minute while a second player may build one unit in the same minute. In another example, the first player may perform ten actions before the second player is able to perform any actions. Accordingly, players that are able to issue more commands to generate more units and direct their units quicker than their opponent are often more successful.

During an RTS match, there is very little idle-time for each player since players are multi-tasking and dividing their attention between different tasks while different events are happening simultaneously. In a RTS game, a player may generate and control dozens of units to gather resources, produce additional units and buildings, control the units to attack, and/or defend across multiple fronts. In order to defeat other players with similar resources, each player is constantly switching their attention between different aspects of the game such as directing units to gather resources, using the resources to generate units, buildings, upgrade buildings, and controlling various units headed to, or currently engaging in combat with another player's units.

Accordingly, resource management is a foundational aspect of RTS games since players grow their army and base by spending resources. Players must control mass quantities of low-level units to find and collect resources in order to build structures, train units, and upgrade technology. The key to successful resource management is balancing the needs of the base (e.g., resource gathering, defense, economy, unit construction, expanding bases, building construction) with the needs of the army (e.g., offense, exploration, upgrading tech, etc.). Thus, players must make strategic decisions about how much to invest in collecting resources, how to save their resources, and how to spend their resources to optimize their resource allocation. A well-thought out resource management strategy ensures a player's base is well-defended, their economy is self-sufficient and thriving, and their army is powerful enough to defend from and attack opponents.

However, the actions associated with controlling low level workers to perform resource management tasks is often mechanical, tedious, and repetitive. For example, the beginning of each RTS game is generally a race to set up their economy and collect as many resources as possible before building up an army. Accordingly, players tend to execute a same pattern of opening moves including controlling their worker virtual units to find and collect resources, spending their initial resources on building more worker virtual units, and spending resources to build any other necessary buildings to generate more worker virtual units, and controlling the newly generated worker virtual units to find and gather resources until they have set up a self-sufficient economy. This results in the first few minutes of each RTS game offering very little variation and feeling mechanical and stale because each player is usually playing the same opening moves. As an example, in a match with a ten minute time limit, at least the first three minutes of the match consists of players playing the same opening moves, which means that the beginning third of the match is usually the same and no "real" action will occur. Furthermore, since the initial minutes of each game are crucial to stimulating an economy, beginners are at a huge disadvantage since experienced players have already memorized and played the same opening moves hundreds of times and, thus, will have a huge advantage in setting up their economy. In other words, in the first few minutes of a match, there is little strategy and skill in setting up an economy, instead, the advantage goes to players who can click and issue actions quicker than others.

As resource collection and management is a vital part of any RTS game, there should be a way to automate or remove the tedious and rote actions that are required to manage workers to collect and manage resources. Players should not need to spend the first few minutes of every match blindly playing the same opening move patterns and not encountering any real action until the middle of the game. In addition, during the game, players should not have to continuously micromanage and monitor their worker virtual units. Instead, players should be focusing their efforts and energy on executing high-level actions such as expanding, teching-up, or attacking enemy forces. Eliminating these types of opening moves and micromanagement also speeds up the game and creates more exciting moments early in the game.

Certain strategic considerations relating to resource management such as disrupting an opponent's economy by attacking their worker units and boosting their economy by expanding to expansion bases should still play an important part in resource management strategy. Therefore, it would be beneficial to have a resource management system that combines the exciting and strategic components of a resource management system operated by workers while removing the monotonous and rote mechanics of controlling and monitoring the workers that exist in related RTS games.

Thus, automating the micromanaging involved in controlling worker units, managing in-game resources, and/or collecting in-game resources in RTS games will free up players to focus on the more interesting and exciting components of RTS games.

SUMMARY

The following presents a simplified summary of one or more aspects in order to provide a basic understanding of such aspects. This summary is not an extensive overview of all contemplated aspects, and is intended to neither identify key elements of all aspects nor delineate the scope of any or all aspects. Its sole purpose is to present some concepts of one or more aspects in a simplified form as a prelude to the more detailed description that is presented later.

The present disclosure relates to methods and apparatus of providing an automated worker system. An aspect of this subject matter described in this disclosure is implemented in a method for managing virtual units. The method includes generating, at a first location in a virtual scene, a first set of virtual units of a user in the virtual scene. Each of the first set of virtual units may be configured to automatically collect at least one resource associated with the first location, where a location of each of the first set of virtual units is fixed in the first location. The method further includes accumulating, for the user, the at least one resource collected by the first set of virtual units based on a number of the virtual units in the first set of virtual units and resource collection rates of the virtual units in the first set of virtual units.

A further aspect of the subject matter described in this disclosure can be implemented in an apparatus for managing virtual units. The apparatus includes a processing circuitry configured to generate, at a first location in a virtual scene, a first set of virtual units of a user in the virtual scene. Each of the first set of virtual units may be configured to automatically collect at least one resource associated with the first location, where a location of each of the first set of virtual units is fixed in the first location. The processing circuitry is also configured to accumulate, for the user, the at least one resource collected by the first set of virtual units based on a number of the virtual units in the first set of virtual units and resource collection rates of the virtual units in the first set of virtual units.

Yet another aspect of the subject matter described in this disclosure can be implemented in a non-transitory computer-readable storage medium storing computer-readable instructions thereon, which, when executed by processing circuitry, cause the processing circuitry to perform a method for managing virtual units. The method comprising generating, at a first location in a virtual scene, a first set of virtual units of a user in the virtual scene. Each of the first set of virtual units may be configured to automatically collect at least one resource associated with the first location, where a location of each of the first set of virtual units is fixed in the first location. The method further comprising accumulating, for the user, the at least one resource collected by the first set of virtual units based on a number of the virtual units in the first set of virtual units and resource collection rates of the virtual units in the first set of virtual units.

To the accomplishment of the foregoing and related ends, the one or more aspects include the features hereinafter described and particularly pointed out in the claims. The following description and the annexed drawings set forth in detail certain illustrative features of the one or more aspects. These features are indicative, however, of but a few of the various ways in which the principles of various aspects may be employed, and this description is not intended to describe all such aspects and their equivalents.

BRIEF DESCRIPTION OF DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIGS. 2A-2D are schematic diagrams of virtual scenes with worker virtual units at a main base according to aspects of the present disclosure.

Like reference numbers and designations in the various drawings indicate like elements.

DETAILED DESCRIPTION

Figure 1:
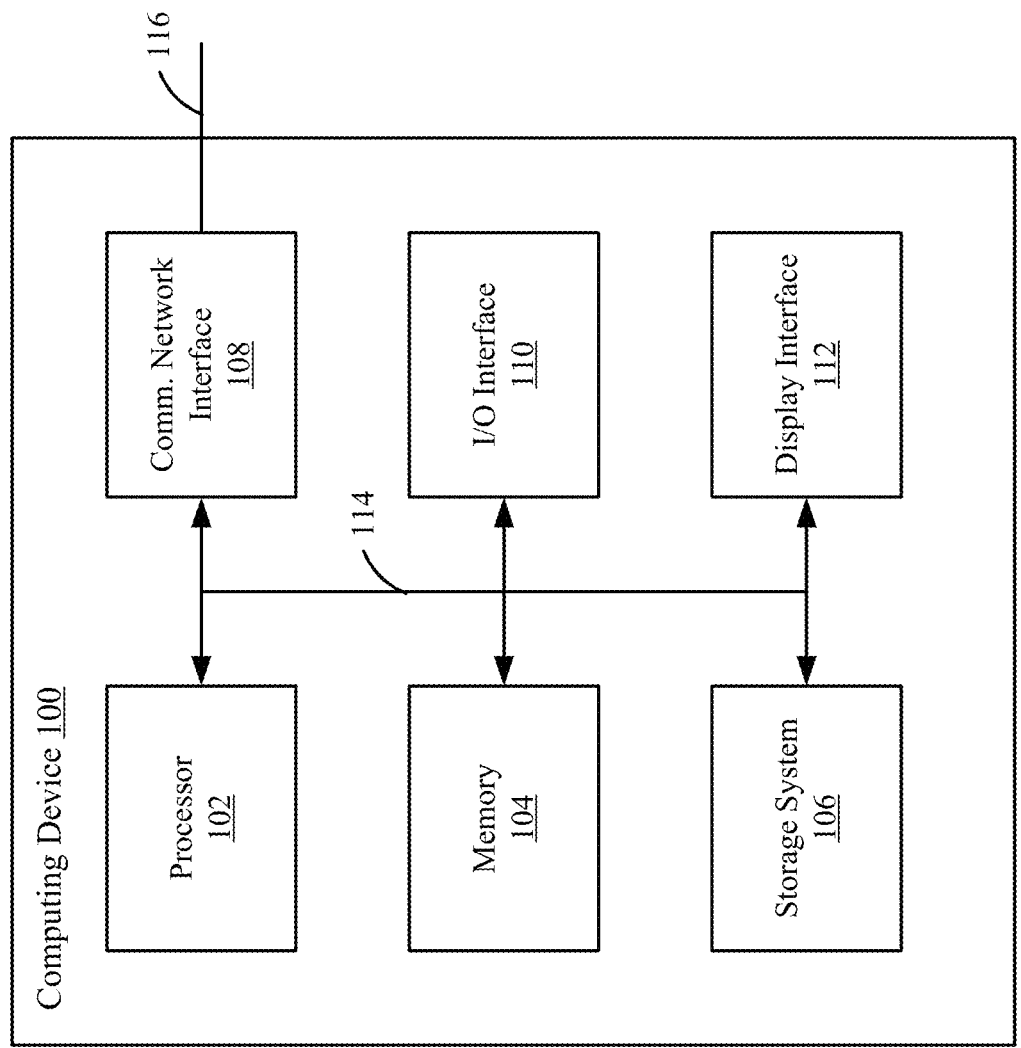
FIG. 1 is a block diagram of an exemplary computing device.

The following description is directed to some exemplary aspects for the purposes of describing innovative aspects of this disclosure. However, a person having ordinary skill in the art will readily recognize that the teachings herein can be applied in a multitude of different ways.

The real-time strategy (RTS) genre typically describes a game where users construct buildings and wield armies in order to dominate a field of play. Importantly, at least for the majority of the game, RTS games do not involve users taking turns such as in turn-based games like chess or checkers. Unlike chess or checkers, where each play proceeds through the course of turns to move one piece, in RTS games, the game rules do not limit moves by turn. Instead, RTS games proceed in real-time or continuous play where action by all users takes place all at once. Accordingly, RTS games are typically fast-paced, exciting, and dynamic since users may adjust and respond their opponent's actions in a real-time scenario. Specifically, each user builds buildings and maneuvers multiple units to secure areas of a game map and/or destroy their opponent's buildings and units.

Some RTS games provide a limited degree of control such that a user specifies a strategic goal and/or issues an order to a unit or group of units and the unit or group of units decides for itself how to execute the order. For example, if the user issues a command for a group of units to attack a certain target location on a map, the group of units may itself decide which path to take to the target location to comply with the command, whether to stop and attack any enemy that appears on their path to the target location, or how to attack enemies at the target location. Some RTS games provide a larger degree of control such that a user specifies every individual action that a unit or group of unit is to execute. Some RTS games provide a mix of degrees of control such that the user may choose the specificity of a command issued to a unit or group of units, and the unit or the group of units will execute the command accordingly.

Generally, RTS games share four main common elements-units, buildings, technologies (or "teching"), and resources. Units are moveable virtual objects (or virtual units) that may be generated and controlled within a game by a user. For example, units may be civilian or worker units for tasks such as gathering resources, repairing, or generating buildings or military units for attacking enemies, scouting enemies, or defending units and/or buildings. Buildings are immovable virtual objects that may research technologies, store resources, generate units, and/or defend a base by attacking nearby enemies. Building management is crucial because buildings provide economic and defensive advantages as well as access to new and better units and technology. Technologies (or "teching") may improve economic or military statistics to give a user an advantage over another by constructing buildings to access other more advanced buildings, advanced weapons, or advanced units. These elements are dependent on there being sufficient resources to generate units, build buildings, or upgrade buildings. The resources are deliberately collected by virtual objects or generated by buildings during the game and managed by a user during the game. Resources are a form of in-game currency and that may be harvested or collected and are spent to train units, generate buildings, and upgrade buildings and units. In most RTS games, the resources are spread across different areas of a game map and may be collected by worker units via some mechanism (e.g., gold is mined, wood is harvested, crops are collected, etc.) within the match. Since resources are limited, users must understand how quickly resources are gathered, how to expand their base to allocate more resources, how to spend their resources, how to disrupt their opponent's economy, etc.

Typically, each round in a RTS game involves at least two users starting with a few basic core units and/or a core building (e.g., core building 206 or core structure shown in FIGS. 2A-2D) in different locations on a two-dimensional (2-D) or three-dimensional (3-D) game map. Nearby resources (e.g., resource locations 218a, 218b, 218c, 218d shown in FIGS. 2A-2D) in the game map may be gathered by worker units (e.g., non-controllable sets of virtual units 208a, 208b, 208c, 208d shown in FIGS. 2A-2C) to produce additional units, build buildings, and/or "tech-ing" up to gain access to more advanced in-game technology (e.g., advanced units or advanced buildings). "Tech" is a verb used in RTS games to describe the actions of building technology buildings (e.g., tech buildings) and/or researching new technologies or upgrades in order to build more advanced units and buildings. Certain units and abilities are not available at the beginning of a game and users must tech later in the game by spending resources to take advantage of them. In the majority of RTS games, a round ends when one user (or a team) destroys a core building, all buildings belonging to their opponent, destroys a "king" or leader unit, or destroys all opponent's units. Other ways a round may end include when a user is successful in securing or capturing an opponent's territory or resources, destroying specific assets, or creating certain resources or buildings first, which is generally limited by a condition to expend accumulated resources. In some examples, a round may have a time limit and if no team is able to achieve a game ending objective, then a winner is decided based on a point system, where points may be earned for killing enemy units, generating buildings, size of an army, an amount of resources allocated, etc.

During a match, users must carefully balance the development of their economy, infrastructure, and techs (e.g., upgrades) with the production of units so they have enough units to gather resources, attack, and defend in the present and save enough resources and techs to succeed later. Users must also balance unit management by considering the advantages and disadvantages of different types of unit construction such as having enough engineers to repair and capture buildings while also having enough military or foundry units to defend and attack. As an example, a user may balance their units by having a variety of units with different properties such as generating units that may perform air attacks, units that may perform long-range attacks, and units that are stronger at defending. This type of unit management adds a layer of tactical thinking since virtual units are classified into different types and/or categories. Users may also strategically control their units and time their attacks, defenses, or unique abilities to maximize their effectiveness on the battlefield. Groups of units may be maneuvered into advantageous positions on the map to surround, flank, or attack the enemy. In addition, individual units may be controlled to attack a weak enemy unit or avoid an incoming attack.

As described herein, virtual objects (or referred to as virtual units interchangeably) are the basic playing pieces within an RTS game. Most RTS games have many different types of virtual objects such that each type of virtual object has their own specific abilities and attributes.

In some examples, virtual objects may be organized by type (e.g., engineer solider, infantry, battleship, spy, etc.), categories (e.g., foundry units or military units) and tiers (e.g., Tier 1, Tier 2, or Tier 3). Each different type of unit may belong to different categories (e.g., military or foundry, armored or light, melee or ranged, air or ground, etc.) and/or different tiers (e.g., Tier 1, Tier 2, Tier 3, etc.) such that each category of type of unit has their own attributes, statistics, properties, and abilities. For example, the virtual objects may also be organized by categories (e.g., foundry units, military units, biological units, mechanical units, armored units, light units, melee units, ranged units, air units, ground units) such that a particular category of virtual objects share common properties and may be generated by unlocking a same type of virtual object. In addition, the tiers denote that there may be prerequisites or predetermined conditions for each tier such as building a particular building in order to "unlock" or "tech" a virtual object from a higher tier. Generally, higher tiered units have more powerful abilities and weapons and are an upgrade over the lower tiered units, but require prerequisite buildings and cost significantly more resources to generate than lower tier units.

Users may train (or generate) virtual objects for various purposes (e.g., such as attacking, defending, scouting, healing, building, etc.) and control the virtual objects to perform specific actions or general commands in the virtual scene via a user input. In some examples, the users may train virtual units via a global build menu (e.g., global build menu 203 shown in FIGS. 2A-2D or global build menu 313 shown in FIGS. 3A-3C) and control and command the virtual objects via a global unit command menu. In some examples, since the worker virtual units are automated, it should be noted that the worker virtual units described in this disclosure are not able to be generated via the global build menu and cannot be controlled via a user input or the global unit command menu by the user.

In order to promote a balance in game play and strategy, a user may be limited to selecting a limited number of different types of virtual units to use before a match begins. Users may select different type of virtual units to use in the game via a "deck." In some examples, users may also select pre-made or saved decks. Accordingly, before the match begins, a user may utilize a deck-building interface with a particular number of slots with each slot having corresponding rules to create their deck. The deck-building interface allows users to easily select virtual units into the different slots (e.g., which tier of virtual object and what type of category of virtual object belong in each slot) of the deck-building interface to choose which type of virtual objects will be available to the user during the game. Implementing particular rules for the slots will force users to select a variety of different tiers, categories, and types of virtual objects. In addition, limiting the amount of virtual objects available to a user in a RTS game to a predetermined number simplifies the game in a manner that is simple and easy for a casual user or non-gamer user to keep track of and understand and allows the user to focus more on the gameplay and strategy of a RTS games. In addition, the deck-building interface allows users to avoid memorizing complicated tech trees and build orders for virtual objects and/or become overwhelmed by dozens of virtual objects available to a user during the game. In some examples, it should be noted that the worker virtual units described in this disclosure are not selectable via the deck-building interface since they are automated, not controllable, and automatically generated and re-generated for users during the RTS match.

As described herein, virtual buildings (e.g., immovable virtual objects) are various buildings that may include at least military buildings, defensive buildings, resource gathering buildings, research buildings, or supply buildings. Military buildings refer to buildings that may generate virtual objects. Defensive buildings refer to defensive buildings such as turrets or walls. Resource gather buildings may refer to buildings that are used to generate and/or store resources. Research buildings may refer to buildings that users may make in order to increase their weapon technology. Supply buildings refer to buildings that enable an increase in unit supply cap.

At a basic level, RTS games are purely about resource management since the winner of the game often has the most efficient economy by collecting the most resources and using those resources most efficiently. Although, each race (or species) may have slight advantages and disadvantages when it comes to economy, general economic principles apply. At a basic level, acquiring the most resources is a race to create a bigger economy than your opponents. This may be accomplished by having more workers collect resources, finding more resources via expansion bases, or disrupting your opponent's economy by attacking their workers and overtaking their resource locations. Users should also weigh spending their resources amassing units and/or buildings (e.g., quantity) or saving their resources to invest in expensive tech expansions and more powerful units (e.g., quality). In other words, users need to decide whether their army and economy is big enough to support new technology/research due to the significant resource commitment required to "tech" up or to train higher level or advanced units. Thus, successful RTS users are able to beat (or at least keep up with) their opponent's economy while wasting less resources than them.

Generally, RTS games have some sort of economics system that is fueled by either an "active resource collection" or a "passive resource collection" system.

In a "passive resource collection" system, users control resource areas which slowly increase your resource accumulation over time while they are under your control. This forces users to spread their army out across an entire map from the beginning of the game to maintain resource flow parity with their opponent. In some RTS games, there are no "economic" worker virtual units and, instead, any units can contribute to the economy by capturing the resource areas. In some RTS games, the resources are generated for free without having to control particular resources areas. In these examples, users may not interrupt another opponent's economy since the resources are not tied to controlling any particular resource areas or workers.

In an "active resource collection" system, users accumulate resources by involving a game entity (e.g., a worker virtual unit) in the process. These worker virtual units are generally produced in mass quantities, are cheap to produce, and only have limited functions of gathering resources. Accordingly, users must control and assign worker units to gather a resource from particular areas of a game map. In addition, the worker units require active monitoring to ensure that enough worker units have been generated, the worker units are working efficiently, are not idling when resources have all been harvested, are not being harassed by opponent's units, etc.

A main advantage of having an "active resource collection" system in an RTS game is to create a more granular resourcing system where users may deal damage ranging from extremely small amounts of damage to very large amounts of damage when there is an action point around killing workers. Since the workers are usually fragile and have limited (or no ability) to defend or fight, users are heavily incentivized to attack these workers, which leads to more action moments throughout the game. In addition, the scrimmages involving workers create earlier and more action moments in the game which lead to more situations where users experience varying degrees of wins and losses. This allows an RTS match to consist of several small battles until either player gains an upper hand in their economy or unit construction and makes a move on an opponent's main base.

In both of the resource systems mentioned above, users may need to play many rounds of games to understand how quickly resources are gathered, how many workers (or harvesters) are needed, and how many passive resource points are required for a certain unit, building, or technology build. Since passive income is connected to positions on a game map, RTS games with a passive resource collection system put more pressure on players to be offensive and multi-tasking by forcing them to attempt to control resource areas that may be difficult to defend. As a result, these types of RTS games tend to feel more hectic on a micromanagement level since players need to quickly capture as many resource areas as possible, and when there are no more spaces left, they need to take over an opponent's position.

By contrast, RTS games with an active resource collection system are more focused on defending a handful of locations. As long as there are resources remaining in the resource locations, users may stay at their base and make plans for the next move. Active income may also be limited by the number of workers-rather than the number of resource locations available, which gives the user a more comfortable situation of choosing their own economy. There eventually is a need to expand to new locations and prevent an opponent from doing the same, but this is a decision that is not forced upon the user due to running out of resources.

The system and style of resource gathering in RTS games may dictate strategy and how the game is played. For example, in RTS games with a passive resource collection system, games are dynamic from the beginning and remain in constant flux. Since opponents may be aware of what areas you control, there is no "sneaky" resource gathering. As another example, RTS games with an active resource collection games favor heavy decision making because losing an expansion is a significant blow and may often mean losing the game. Additionally, due to the "Fog of War" mechanics, players may have "sneaky" expansions to gather resources.

Even though each RTS game approaches resource management differently, the majority of RTS games share two strategic considerations: (1) an ability to attack or deny resource systems of an opponent and (2) ability to invest in economy. In the first strategic consideration, a user may implement a strategy for gaining an indirect win in the near future rather than immediately by harassing opponent workers to influence or manipulate their opponent's income. In the second strategic consideration, the RTS game is given a lot more depth and risk management because users must consider how much to spend on resource gathering rather than on defense.

Traditionally, it has been tedious and repetitive to manage worker virtual units involved in resource management and, although worker virtual units are very important to the game and success of a user, micromanaging the worker virtual units can be a distraction that takes away from the real fun of RTS games. In an RTS game setting where every second and action matters, it would be helpful to eliminate or automate the actions required to generate, manage, and control worker virtual units to collect and manage resources. This allows users to focus their attention and actions on the concepts that make RTS games fun and unique such as unit construction, strategizing what counters to build, where and when to expand, and when to attack an opponent. Additionally, it would be helpful to keep the strategic and fun elements of having a worker based resource system.

Aspects of the present disclosure implement a method of providing an automated worker system such that decision making and controls around worker virtual units involved in resource management are automated. For example, worker virtual units will automatically gather resources, are automatically generated when bases are built, and automatically regenerate themselves when they are eliminated. In addition, in some examples, the worker virtual units are not controllable by a user, do not cost resources to build, cannot be built by a user, and do not count towards any unit supply cap limitations. In these examples, even though the worker virtual units are automated and not controllable by a user, the strategy considerations of having a worker based resourcing system still exists since users may still critical strategic decisions such as expanding to expansion bases and disrupting an opponent's economy by attacking their workers. The automated worker system allows for an easier and more fun experience where users do not need to micromanage or manually execute tedious tasks to generate, control, and monitor worker virtual units.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different system configurations, networks, interactive methods, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatuses and methods. These apparatuses and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing circuitry). One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a block diagram of an exemplary computing device 100. A computing device 100 includes at least a processor 102, a memory system 104, a storage system 106, a communication network interface 108, an input/output (I/O) interface 110, and a display interface 112 communicatively coupled to a bus 114. The processor 102 is configured to execute executable instructions (e.g., programs). In some aspects, the processor 102 includes circuitry or any processor capable of processing the executable instructions.

As described herein, a device, such as the computing device 100, may refer to any user device, apparatus, or system configured to perform one or more techniques described herein. For example, a user device may be a client device, a computer (e.g., a personal computer (PC)), a desktop computer, a laptop computer, a tablet computer, a computer workstation, or a mainframe computer, a phone, a smart phone, a video game platform or console, a handheld device (e.g., a portable video game device or a personal digital assistant (PDA)), a wearable computing device (e.g., a smart watch), an augmented reality device, a virtual reality device, a display or display device, a television, a television set-top box, a network device, a digital media player, a video streaming device, a content streaming device, an in-car computer, or any other device configured to perform one or more techniques described herein. Processes herein may be described as performed by a particular component (e.g., a CPU), but, in further aspects, can be performed using other processing components configured to perform the described processes.

The computing device 100 may be any user device with a processor and memory. While many user devices on which to play computer games are different, the user devices may share some common characteristics. For instance, the user devices may have some method of capturing user input such as a computer mouse, keyboard, remote control, touchscreen, game controller, or the like. In addition, the different user devices may also have some method of displaying a two-dimensional image using a display such as a TV screen or computer monitor (e.g., LED, LCD, or OLED) or touchscreen. In some devices, the user devices may have some method of displaying a three-dimensional image using a display such as a head-set display or augmented reality device. The user devices may have some form of processing CPU, although the capability often widely varies in terms of capability and performance. Further, in some aspects, the user devices may have a connection to the internet, such as an Ethernet connection, WiFi connection or mobile phone cell data connection.

In various aspects, one or more users may utilize their respective computing device to play one or more RTS games. The computing device 100 may display a virtual scene with virtual units, virtual buildings, one or more user interfaces (UIs) or visual displays associated with the RTS game. The user interfaces may be configured to receive user selections (e.g., user input) for displaying visual menus, selecting units for use in the game, or controlling virtual objects within the RTS game. For example, there may be any number of menus that provide opportunity for user selection via buttons, radio buttons, check boxes, sliders, text fields, selectable objects, moveable objects, and/or the like.

The memory system 104 is any memory configured to store data. Some examples of the memory system 104 are storage devices, such as random-access memory (RAM) or read-only memory (ROM). The memory system 104 can include a RAM cache. In various aspects, data is stored within the memory system 104. The data within the memory system 104 may be cleared or ultimately transferred to the storage system 106.

The storage system 106 is any storage configured to retrieve and store data. Some examples of the storage system 106 are flash drives, hard drives, optical drives, and/or magnetic tape. In some aspects, the computing device 100 includes a memory system 104 in the form of RAM and a storage system 106 in the form of flash data. Both the memory system 104 and the storage system 106 includes computer readable media which may store instructions or programs that are executable by a computer processor including the processor 102.

The communication network interface 108 can be coupled to a network (e.g., communication network) via a link 116. The communication network interface 108 may support communication over an Ethernet connection, a serial connection, a parallel connection, or an ATA connection, for example. The communication network interface 108 may also support wireless communication (e.g., 802.11 a/b/g/n, WiMax). It will be apparent to those skilled in the art that the communication network interface 108 can support many wired and wireless standards.

The I/O interface 110 is any device that receives input from the user and outputs data. The display interface 112 is any device that is configured to output graphics and data to a display. In one example, the display interface 112 is a graphics adapter.

It will be appreciated by those skilled in the art that the hardware elements of the computing device 100 are not limited to those depicted in FIG. 1. The computing device 100 may include more or less hardware elements than those depicted. Further, hardware elements may share functionality and still be within various aspects described herein.

Resource collection and management is critical to a success in an RTS game. At their core, resource systems exist in RTS games to control user choice. Many RTS games are built on top of a system of progression from low cost, low power units to more interesting, more powerful, and specialized units.

Users must also constantly balance between spending available resources on training new units and purchasing upgrades to strengthen their defenses or improve their offense. Thus, it is critical to actively monitor the resources available in the game map and the resource production of units and buildings to ensure that a user may engage in resource-intensive gameplay without running out of resources or becoming over-extended. This require users to manage many virtual units simultaneously in real-time, requiring a focus on reaction time, multi-tasking, and micromanagement. To effectively manage and use these virtual unit, users must ensure that they construct a variety of units each tasked with respective roles and efficiently use their in-game resources (or resources).

In an RTS game, the general pattern of resource collection and management steps include locating, extracting, and allocating resources to support gameplay. Users then create additional units and structures, which are generally limited by a requirement to expend accumulated resources. These resources are in turn garnered by controlling special points on the map (e.g., passive resource collection) and/or possessing certain types of units and structures devoted to resource collection (e.g., active resource collection).

In a related RTS game with a passive resource collection system, users capture particular resource areas located throughout a game map. Once a user has captured a particular resource area, their resource allocation will increase over time as long as the particular resource area is still under their control. Since there are no "economic" workers such as worker virtual units needed to gather resources, a user may focus their initial unit construction on scouts and virtual units that may take over, control, and defend the different resource areas on a map. This allows users to focus on more exciting actions such as exploration, constructing an army composed of variety of virtual unit types, attacking, and defending—as opposed to building up their initial economy by generating worker virtual units and controlling the worker virtual units to harvest resources. In addition, users are incentivized to spread their army across the game map from the beginning of the game in order to maintain flow parity with their opponents.

In related RTS games with an active resource collection system, workers may collect the resources from the game map and return the resources to a dumping ground (e.g., core control, etc.) before the resources are allocated to a user. These worker units are generally cheap, produced in mass quantities, weak, and have limited to no ability to attack or defend. Over the course of a match, dozens of these worker units are created to mine resources near a user's base or command center (or expansion base) and to return the resource to the player base. During a typical RTS match, about 80-90 of the 200 population cap will be involved in research gathering during the game's peak. As such, it may be tedious and repetitive to generate, control, and monitor these worker virtual units.

Thus, a typical RTS game with an active resource collection system contains many resource management related concerns and tasks including generating, controlling, and monitoring worker virtual units which may be removed or automated. First, each worker virtual unit typically costs resources to build, which means that users predictably spend the first few minutes of each game making the same opening move patterns of controlling their workers to gather resources, gathering resources, spending their initial resources on generating more worker virtual units, and directing those newly generated worker virtual units to gather resources. Second, each worker virtual unit may also require supply to build, which means that user must manage supply buildings that increase supply count or additional resources before the worker virtual unit can be built. Third, each worker virtual unit must be managed and controlled by the user. This means that users have to manually decide and determine when and how many worker virtual units to generate, which resource each worker virtual unit should harvest by commanding each worker virtual unit to harvest a particular resource or resource location, and how many worker virtual units should be assigned to each resource. In addition, when a user's worker virtual unit is under attack by an opponent's forces, the user must manually control how each worker virtual unit responds and will have to control the worker virtual unit to defend (if they are able to), attack (if they are able to), run away, or stay and continue to gather resources until they are destroyed.

Furthermore, users must keep track of and manage each resource location to optimize a correct number of worker virtual units for each resource location and to ensure that resource locations are not depleted of resources. In other words, a particular resource location may become oversaturated due to worker virtual units not efficiently harvesting the resources, or, even worse, sitting around doing nothing by not being able to access the particular resource location due to overcrowding or being unable to harvest resources since the resource location has been depleted of resources. As an example, having eight worker virtual units harvesting minerals at a base with eight mineral patches may yield 480 minerals a minute, while having 16 worker virtual units harvesting minerals may yield 810 minerals per minutes (e.g., an increase of about 330 minerals per minute). However, any additional worker virtual units (over 16 worker virtual units) are in a "saturation zone" since they increase harvesting capacity, but not as much as the rate of the previous worker virtual units. Continuing along with the example, having 24 worker virtual units harvesting minerals at the base with eight mineral patches may only yield 1000 minerals per minute, which is only an increase of 190 minerals per minute over having 16 worker virtual units. Thus, it is also important to keep track of worker virtual units and maximize a resource production and reduce saturation as soon as a user is able to expand to an expansion base.

As another example, in a typical RTS game, each base requires up to a few dozen workers that have to be manually generated, controlled, and monitored throughout the game. As an initial matter, each worker costs resources and supply to build, which means that players have to manually manage how many and when to spend resources on workers and manage supply granting buildings that also cost resources. Additionally, each base may have three different resource locations that users have to monitor and manually assign workers to harvest the different resource locations. Since resources at resource locations are finite, the workers may be monitored to check if the different resource locations still have resources left to harvest. This means that once the resources at the resource locations are all harvested, the assigned workers will sit idle unless ordered to do something else. In addition, there are between one to eight bases in each map, which means that these controlling and monitoring tasks are compounded when users capture and expand to different bases. Since there may be limits of how many workers can be produced at a certain location, when there are multiple bases in the game, users have to manually transfer an appropriate number of workers to the correct location while avoiding harassment by enemies. Such tasks for resource management may be time consuming, rote, and boring.

In contrast to resource management systems in related RTS games, the automated worker system discussed in the disclosure has removed or automated the resource management tasks listed above. As an example, the worker virtual units do not cost resources, do not count towards a supply cap, and do not need to be selected before the game via a deck-building interface. In addition, in some examples, users do not need to track efficiency of worker virtual units since each resource location on the map will have a set number of worker virtual units. In some examples, the worker virtual units in the automated worker system are also immobile and not controllable by the user. Thus, in these examples, users do not need to manage where to send workers to different resource locations or control the workers when the workers are under attack. Instead, the worker virtual units are automatically generated and re-generated at fixed resource locations on the map and their only function is to harvest resources.

Thus, the core element of resource gathering and the benefits of having dedicated worker virtual units are still intact without the tedious and boring actions related to generating, controlling, and monitoring the worker virtual units. Accordingly, a user does not need to micromanage their workers anymore. Users may still disrupt an opponent's economy by attacking worker virtual units, however, the tedious routine tasks involved in resource management for the worker virtual units are eliminated or automated. Instead, the only decision around workers is whether to defend their workers and whether to attack an opponent's workers to gain an income advantage. As a result, action moments are created earlier in the game since the routine economy building steps that are always performed at the beginning of RTS games are removed. In addition, during the game, since the micromanagement steps for controlling worker virtual units have been automated, the user can focus on more meaningful tasks. This may result in more action moments around the workers to occur which creates varying degrees of successes and failures throughout the match. This is critical for the player to enjoy playing the game by creating unique matches with high replay value.

FIGS. 2A-2D are schematic diagrams of virtual scenes with worker virtual units at a main base (e.g., core building) according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

Examples 200a-d include a computing device 202 displaying virtual scenes 201a-201d including at least a core building 206, a first set of virtual units 208a, 208b, 208c, 208d, and resource locations 218a, 218b, 218c, 218d associated with the core building 206.

In some examples, the first set of virtual units 208a, 208b, 208c, 208d and the core building 206 are pre-built for each user when the match begins. As shown in example 200a of FIG. 2A, the resource locations 218a, 218b, 218c, 218d associated with the core building may be split up into four sub-groups.

The core building 206 has a health indicator 216 which indicates how much health the core building 206 has. In some examples, the objective of the game is to destroy an core building belonging to an opponent such that the winner is determined by destroying an opponent's core building. In some examples, when users are playing in teams, there may be a single core building for the entire team. In some examples, where users are playing in teams, there may be a respective core building for each teammate, but each respective core building health may have a health indicator 216 shared for the entire team.

In some examples, the resource locations 218a, 218b, 218c, 218d may contain only one type of resource (e.g., first type of resource 210). In some examples, the resource locations 218a, 218b, 218c, 218d may contain a first type of resource and a second type of resource (e.g., second type of resource 212). In examples where the resource locations 218a, 218b, 218c, 218d contain multiple types of resources, each of the different types of resources may be collected at different resource collection rates, but the different types of resources may be collected simultaneously.

In some examples, the amount of resources at the resource locations 218a, 218b, 218c, 218d may be infinite such that a user may continue to accumulate resources as long as at least one unit from the first set of virtual units is alive. In some examples, the amount of resources may be finite at the resource locations 218a, 218b, 218c, 218d such that the resources will eventually be depleted and the user stops accumulating resources even if workers from the first set of virtual units are alive. In some example, the finite resources may regenerate over time. In some examples, in matches with a time limit (e.g., 10 minutes), the amount of resources is infinite until a predetermined time elapses (e.g., 9 minutes) at which point the first set of virtual units at the resource locations are eliminated so users can no longer accumulate resources from that resource location.

In some examples, the virtual units from the first set of virtual units 208a, 208b, 208c, 208d have a limited role in that the virtual units can only collect resources at a predetermined resource collection rate and cannot move, attack, or defend. In some examples, a virtual unit may have a health indicator 214. In addition, in some examples, users cannot generate, control, or move any virtual units from the first set of virtual units 208a, 208b, 208c, 208d. The limited role and lack of control for the virtual units from the first set of virtual units 208a, 208b, 208c, 208d eliminates the need to micromanage these types of worker virtual units. In some examples, since the virtual units from the first set of virtual units 208a, 208b, 208c, 208d cannot move or be controlled by a user, the virtual units are all fixed at specific locations of the resource locations 218a, 218b, 218c, 218d and collect at least one type of resource while they are alive. In these examples, this means that the user does not need to manage the workers or control the virtual units from the first set of virtual units 208a, 208b, 208c, 208d. The only interaction a user will have with their own virtual units from the first set of virtual units 208a, 208b, 208c, 208d is to decide whether to defend them with other units when the virtual units from the first set of virtual units 208a, 208b, 208c, 208d are under attack by an opponent.

In most RTS games, the worker virtual units are the most expendable unit in the game and so they are usually weak and have low health. As shown in FIG. 2A, virtual units from the first set of virtual units 208a, 208b, 208c, 208d are weak and have a low amount of health as indicated by a health indicator 226 corresponding to each unit. Each health indicator 226 indicates the amount of health remaining for a respective unit. When the virtual units from the first set of virtual units 208a, 208b, 208c, 208d are killed by an opponent, the eliminated worker virtual unit will automatically re-generate at no cost to the user after a predetermined time period (e.g., 30 seconds). In some examples, the virtual units from the first set of virtual units 208a, 208b, 208c, 208d do not cost resources or supply to generate and they do not count towards any unit cap rules or supply cap limitations in the game. This means that users do not need to spend resources to generate workers or even decide when to build the workers.

In some examples, the virtual scene may include a global build menu 204. In some examples, the global build menu 204 is generated based on a deck selection made by the user via a deck-building interface. The global build menu 204 may be utilized by a user to generate virtual units. However, in some examples, it is important to note that since the first set of virtual units 208a, 208b, 208c, 208d are automatically generated with generation of a core building and automatically re-generated when eliminated, the first set of virtual units 208a, 208b, 208c, 208d cannot be generated by the user via the global build menu 204 or any other user input. In some examples, the global build menu 204 may display real-time information such as an accumulated amount of a first type of resource 210, an accumulated amount of a second type of resource 212, or a unit cap 213. A unit cap may be the maximum number of units each player may have. It should be noted that although there are dozens of virtual units from the first set of virtual units 208a, 208b, 208c, 208d of the user in the virtual scene 201a, the unit cap 213 is at 0 because these type of units do not count towards unit supply cap rules.

Figure 2B:
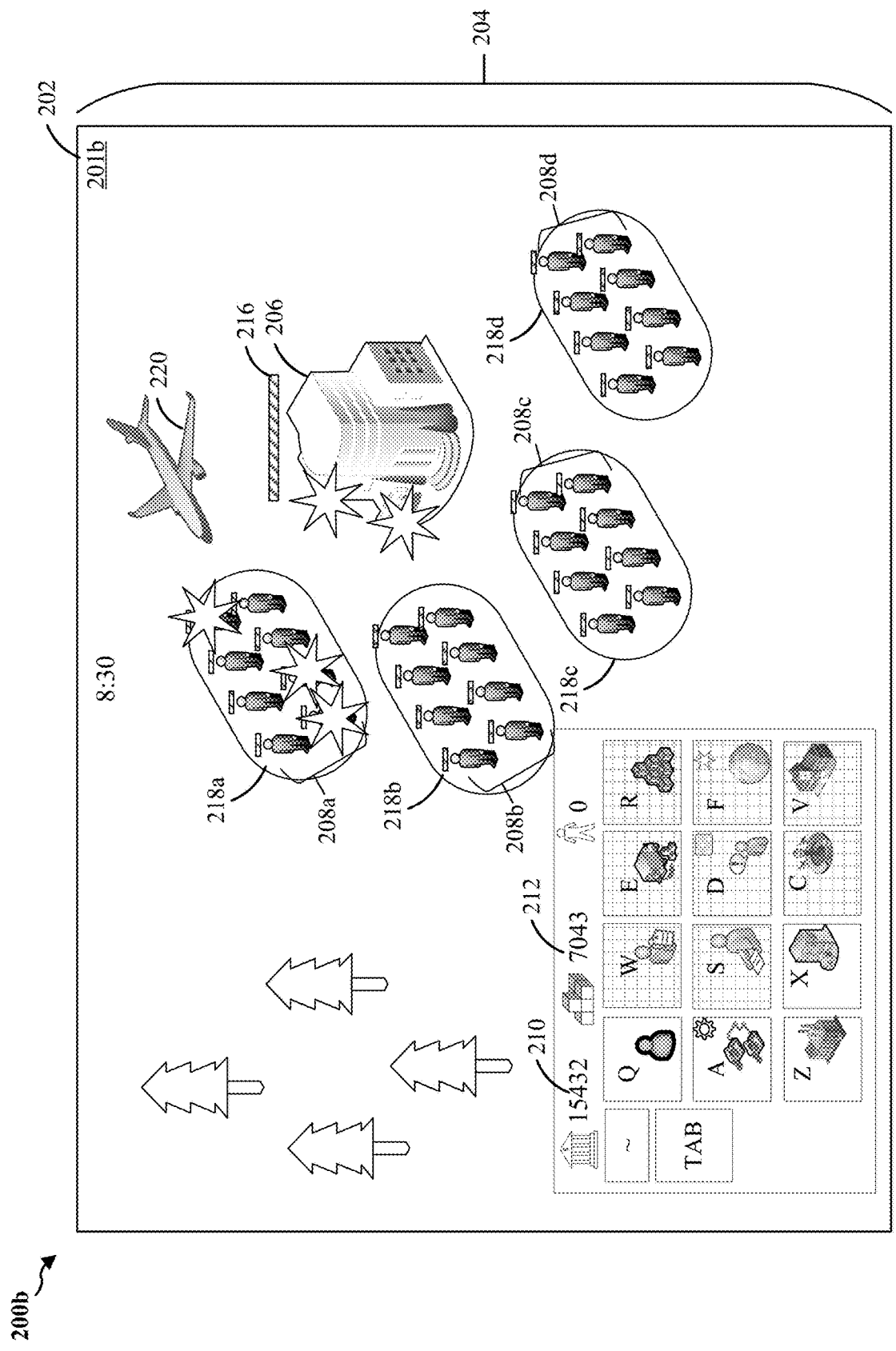

As shown in example 200b in FIG. 2B, an opponent may control their virtual units to attack a user's base and virtual units. Specifically, as shown in example 200b, the opponent has controlled a fighter jet 220 to attack the core building 206 and virtual units from the first set of virtual units 208a, 208b, 208c, 208d to interrupt the economy of the first user. In some examples, it should be noted that the virtual units from the first set of virtual units 208a, 208b, 208c, 208d themselves cannot attack, run away, or defend against virtual units belonging to the opponent. However, the user may use other virtual units (e.g., other than virtual units from the first set of virtual units 208a, 208b, 208c, 208d) to attack and help defend against virtual units belonging to the opponent attacking the virtual units from the first set of virtual units 208a, 208b, 208c, 208d.

As also shown in example 200b, due to time elapsing between the virtual scene 201a and virtual scene 201b, the accumulated amount of a first type of resource 210 and the accumulated amount of a second type of resource 212 have increased due to the first set of virtual units 208a, 208b, 208c, 208d collecting the first type of resource at a first resource collection rate and the second type of resource at a second resource collection rate.

Figure 2C:
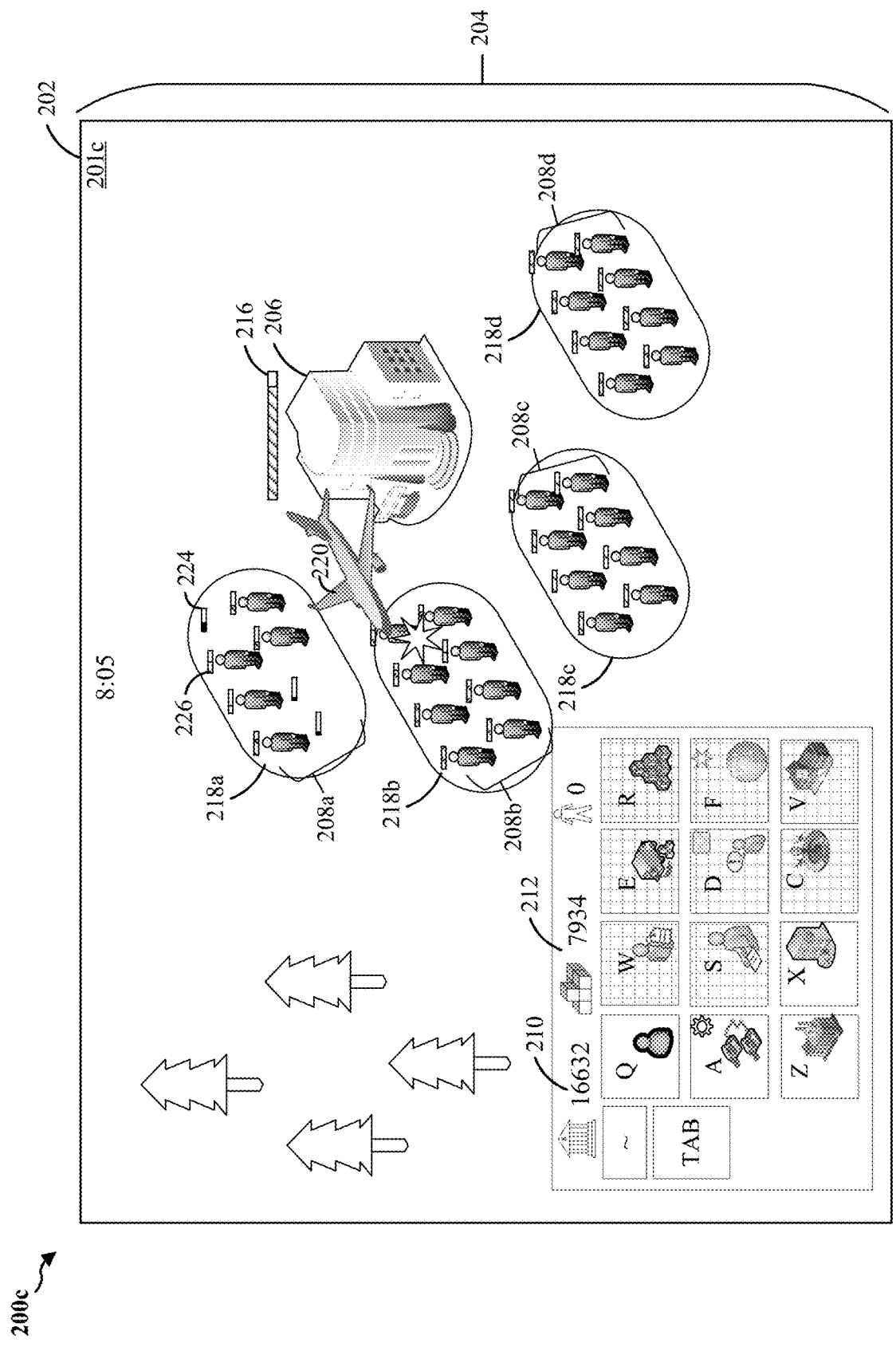

As shown in example 200c in FIG. 2C, the fighter jet 220 has eliminated three virtual units from the first set of virtual units 208a, damaged five virtual units from the first set of virtual units 208a as indicated by a less than full health bar on the health indicator 226, and damaged the core building 206 also as indicated by a less than full health bar on the health indicator 216. Since the three virtual units from the first set of virtual units 208a have been eliminated, a respective regeneration progress indicator 224 associated with each eliminated virtual units is displayed. The regeneration progress indicator 224 indicates a time remaining until the respective eliminated virtual unit from the first set of virtual units 208a is regenerated in the same position in the first location of the virtual scene. As already noted above, in some examples, the regeneration of the eliminated virtual from the first set of virtual units 208a is not associated with a resource cost, a supply cost, or a unit cap of the user.

While the three eliminated virtual units are regenerating, the user is not able to collect resources from the first resource location 218a at a maximum rate due to the absence of the eliminated virtual units. In virtual scene 201c, since three virtual units from the first set of virtual units 208a have been eliminated, the accumulation rate of the collection of the first type of resource 210 and the second type of resource 212 by the first set of virtual units 208a, 208b, 208c, 208d will be slower than as compared to the first set of virtual units 208a, 208b, 208c, 208d in the virtual scene 201b due to a smaller number of virtual units from the first set of virtual units 208a, 208b, 208c, 208d collecting resources. This highlights the strategic move of disrupting an opponent's economy by killing their worker virtual units and the importance of defending worker virtual units.

Figure 2D:
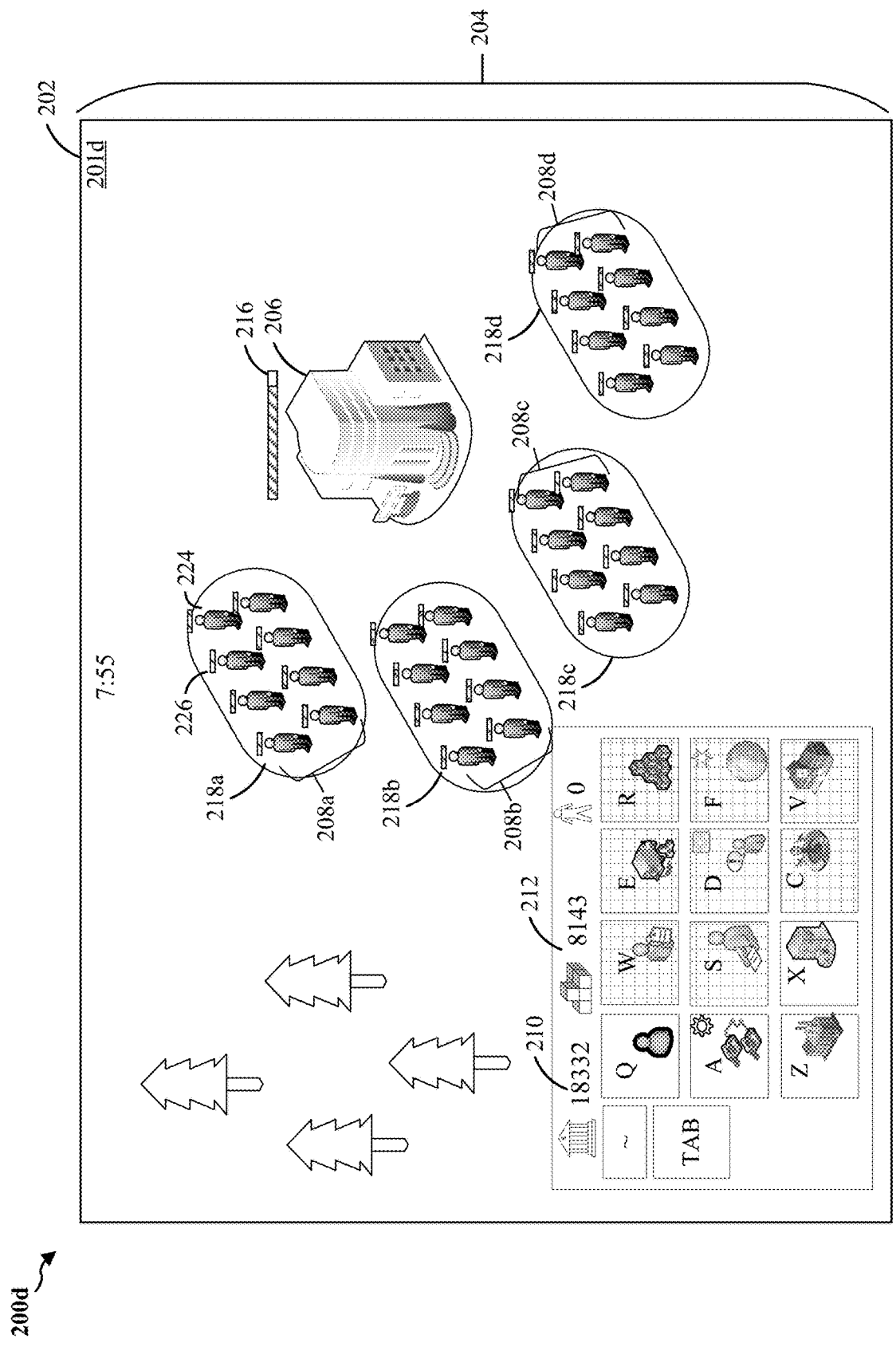

As shown in example 200d in FIG. 2D, in the virtual scene 201d, the eliminated three virtual units from the first set of virtual units 208a are automatically regenerated in a same position in the first location of the virtual scene after a preset period of time (e.g., 30 seconds).

It will be understood by those skilled in the art that the specific number of virtual units and resources indicated in the virtual scenes 201a-d are not limited to the amounts. The technical solution according to the present disclosure may include additional or fewer virtual units or include additional or fewer resource locations and types of resource. In addition, the first set of virtual units 208a, 208b, 208c, 208d may be represented as one or more virtual buildings instead of virtual units.

During the match, a user may increase their resource collection rate by expanding their base to expansion bases to access additional resource locations. Expansions can be thought of as both a cost and a risk factor since, in addition to gaining income, users must also defend their expansions. Generally, users scout for the resource expansion fields, since expansion bases are spread across a game map, and spend enough resources and manpower to properly defend the expansion base from enemy attack. As a related point, users are also incentivized to scout potential attacks on opponent's expansion bases to disrupt an opponent's economy or, in some cases, overtake an opponent's expansion.

Figure 3A:
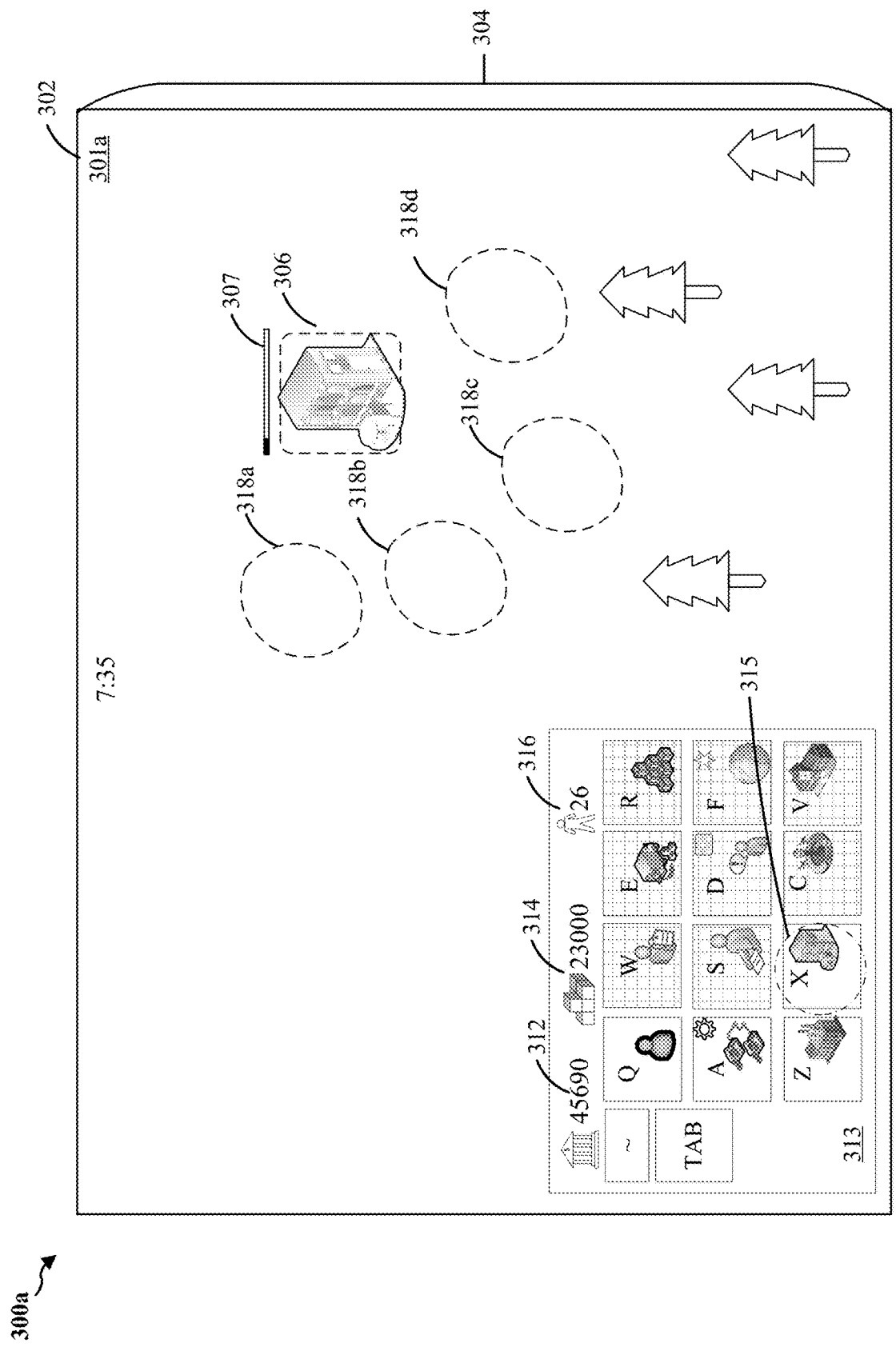
FIGS. 3A-3C are schematic diagrams of a virtual scene with worker virtual units at an expansion base according to aspects of the present disclosure.
Figure 3B:
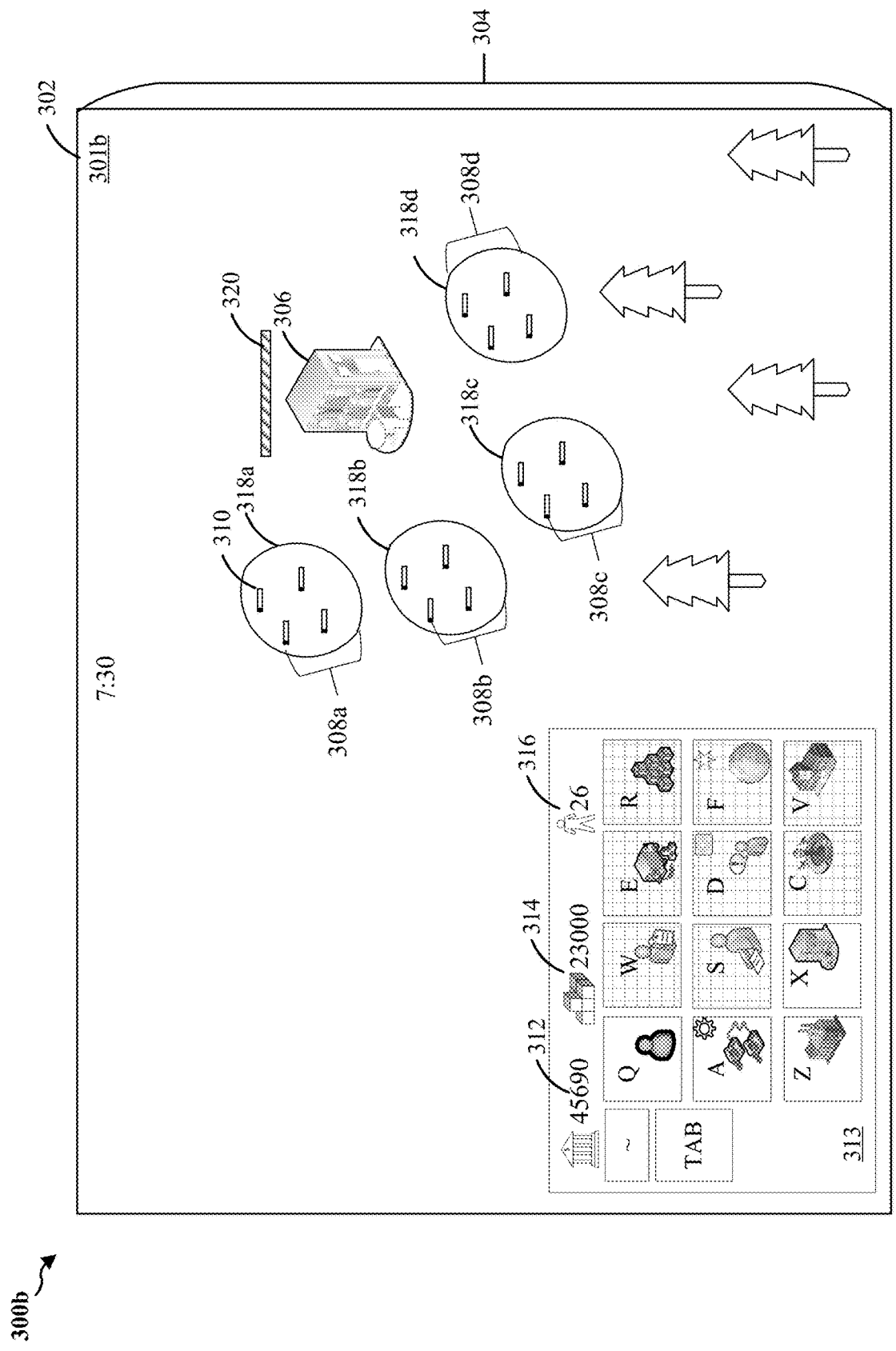

FIGS. 3A-3B are schematic diagrams of virtual scenes with worker virtual units at an expansion base according to aspects of the present disclosure. While pertinent features are shown, those of ordinary skill in the art will appreciate from the present disclosure that various other features have not been illustrated for the sake of brevity and so as not to obscure more pertinent aspects of the example implementations disclosed herein.

Examples 300a-c include a computing device 302 displaying virtual scenes 301a-301c including at least a global build menu 304 and resource locations 318a, 318b, 318c, 318d. As shown in example 300a, the user has selected a build element labeled X 315, which corresponds to an expansion base, from the global build menu 304 to initiate building the expansion base 306. As shown in the virtual scene 301a, the expansion base 306 is under construction and displayed with a build time indicator 307 indicating a progress of when the expansion base 306 build will be completed.

As shown in example 300a of FIG. 3A, the resource locations 318a, 318b, 318c, 318d associated with the core building may also be split up into four sub-groups. Similar to the resource locations 218a, 218b, 218c, 218d shown in FIGS. 2A-2C, the resource locations 318a, 318b, 318c, 318d may contain only one type of resource (e.g., first type of resource 312) or the resource locations 318a, 318b, 318c, 318d may contain the first type of resource and a second type of resource (e.g., second type of resource 314). In examples where the resource locations 318a, 318b, 318c, 318d contain multiple types of resources, each of the different types of resources may be collected at different resource collection rates, but the different types of resources may be collected simultaneously.

In some examples, the amount of resources at the resource locations 318a, 318b, 318c, 318d may be infinite such that a user may continue to accumulate resources as long as at least one unit from the first set of virtual units is alive. In some examples, the amount of resources may be finite at the resource locations 318a, 318b, 318c, 318d such that the resources may be depleted and the user stops accumulating resources from the resource locations 318a, 318b, 318c, 318d even if workers from the first set of virtual units are alive. In some example, the finite resources may regenerate over time.

As shown in example 300b in FIG. 3B, virtual units from a second set of virtual units 308a, 308b, 308c, 308d begin generation as indicated by a generation progress bar 310 after the expansion base 306 is completed. In some examples, a health bar 320 will be displayed next to the expansion base 306. In some examples, the second set of virtual units 308a, 308b, 308c, 308d are generated at the same time that the expansion base 306 is generated. The virtual units from a second set of virtual units 308a, 308b, 308c, 308d have the same functionality, role, and limitations as the virtual units first set of virtual units 208a, 208b, 208c, 208d shown in FIGS. 2A-2C since they are the same type of worker virtual unit.

As shown in example 300c, once the virtual units from a second set of virtual units 308a, 308b, 308c, 308d are generated, then the virtual units from a second set of virtual units 308a, 308b, 308c, 308d may begin to collect resources from the resource locations 318a, 318b, 318c, 318d. In some examples, the virtual units from a second set of virtual units 308a, 308b, 308c, 308d may collect the first type of resource 312 at a third resource collection rate and collect the second type of resource 314 at a fourth resource collection rate. In some examples, the third resource collection rate corresponding to the first type of resource 312 is a same rate as the first resource collection rate for the first resource at the core building and/or the fourth resource collection rate corresponding to the second type of resource 314 is also same rate as the second resource collection rate for the second resource at the core building. In some examples, the third resource collection rate is different than the first resource collection rate at the core building and/or the fourth resource collection rate is different than the second resource collection rate for the second resource at the core building.

It should be noted that a number of virtual units from a second set of virtual units 308a, 308b, 308c, 308d generated in the second set is less than an amount of virtual units generated in the first set 208a, 208b, 208c, 208d. As shown in the virtual scene 301c in FIG. 3C, the total number of virtual units from the second set of virtual units 308a, 308b, 308c, 308d is 16 and, as shown in the virtual scene 201a from FIG. 2A, the total number of virtual units from the first set of units 208a, 208b, 208c, 208d is 32.

It should also be noted that, for matches with a time limit (e.g., 10 minutes), if the match has reached a first predetermined playing time (e.g., 9 minutes) and the first set of virtual units at the first location is eliminated, the virtual units from the second set of virtual units 308a, 308b, 308c, 308d are not eliminated and the user may continue to collect resources from the second set of virtual units 308a, 308b, 308c, 308d at the appropriate resource collection rates.

FIGS. 4-8 illustrate flowcharts of methods for managing virtual units in accordance with one or more techniques of this disclosure.

Figure 4:
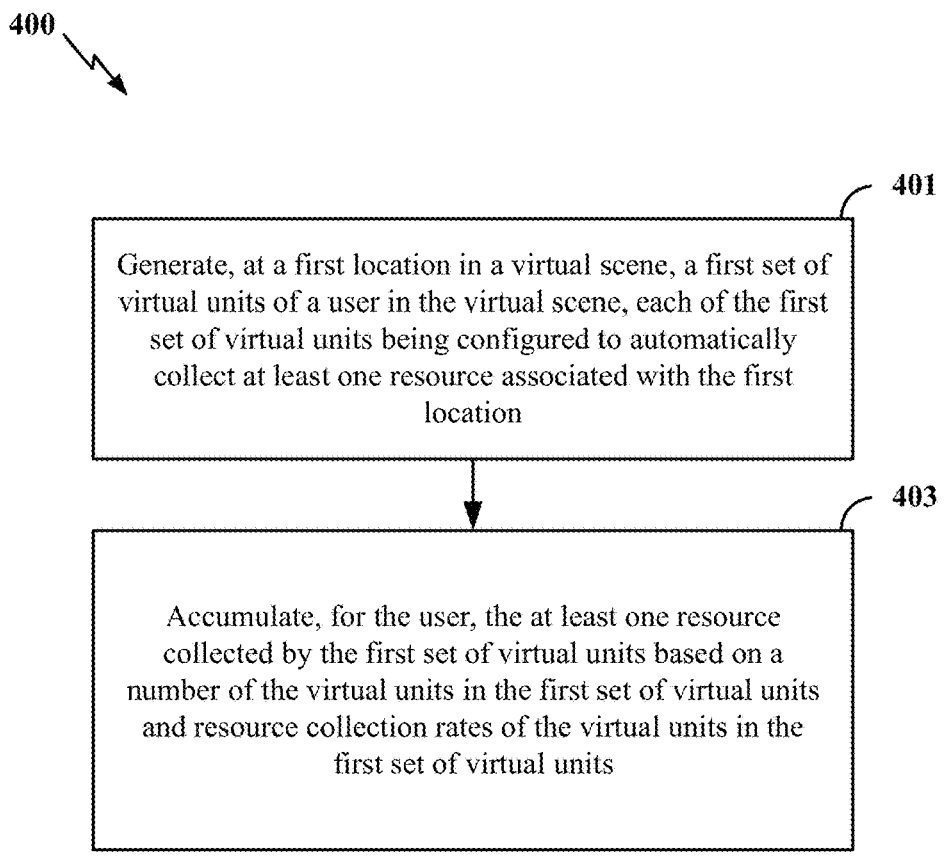
FIGS. 4-8 illustrate flowcharts of methods for managing virtual units in accordance with one or more techniques of this disclosure.

FIG. 4 illustrates a flowchart of various example methods of providing an automated worker system at a computing device in accordance with one or more techniques of this disclosure. The method 400 may be performed by an apparatus, such as the computing device 100, as described above. In some implementations, the method 400 is performed by processing logic, including hardware, firmware, software, or a combination thereof. In some implementations, the method 400 is performed by a processor executing code stored in a non-transitory computer-readable storage medium (e.g., a memory). The method 400 includes managing virtual units at a computing device.

At block 401, the method 400 may include generating, at a first location in a virtual scene, a first set of virtual units of a user in the virtual scene. Each of the first set of virtual units may be configured to automatically collect at least one resource associated with the first location, where a location of each of the first set of virtual units is fixed in the first location. As an example, referring to FIG. 2A, each of the first set of virtual units 208a, 208b, 208c, 208d are generated to respective resource locations 218a, 218b, 218c, 218d. These units are fixed to a particular location of the resource locations 218a, 218b, 218c, 218d and configured to automatically collect a first type of resource 210 and a second type of resource 212. In some examples, each of the first set of virtual units may not be generated based on a user command. In some examples, each of the first set of virtual units may not be controlled by the user.

In some examples, the first set of virtual units may be generated in association with generation of a core building of the user in the virtual scene, where the first location is associated with generation of the core building. As an example, referring to FIG. 2A, the first set of virtual units 208a, 208b, 208c, 208d is generated in association with the core building 206 and the resource locations 218a, 218b, 218c, 218d are also associated with the core building 206. In some examples, the first set of virtual units may be generated at a start of a round or a match begins in the virtual scene. In some examples, the generation of the first set of virtual units is the first action that happens in the match for users.

In some examples, each of the virtual units in the first set may be configured to collect a first resource at a first resource collection rate. In some examples, each of the virtual units in the first set may be further configured to collect a second resource associated with the first location at a second resource collection rate. In some examples, each of the virtual units in the first set may be further configured to simultaneously collect the first resource at the first resource collection rate and the second resource at the second resource collection rate. As an example, referring to FIG. 2A, the first set of virtual units 208a, 208b, 208c, 208d automatically collects a first type of resource 210 at a first collection rate and a second type of resource 212 at a second collection rate simultaneously.

At block 403, the method 400 may include accumulating, for the user, the at least one resource collected by the first set of virtual units based on a number of the virtual units in the first set of virtual units and resource collection rates of the virtual units in the first set of virtual units. As an example, referring to FIG. 2A, a first type of resources 210 and a second type of resource 212 are accumulated based on a number of the first set of virtual units 208a, 208b, 208c, 208d and their respective resource collection rates.

In some examples, the virtual scene is generated by a real-time strategy (RTS) game and the user is a player of the RTS game.

It is understood that the method illustrated by FIG. 4 is exemplary in nature and that the steps described herein may be combined or modified to generate alternative aspects.

Figure 5:
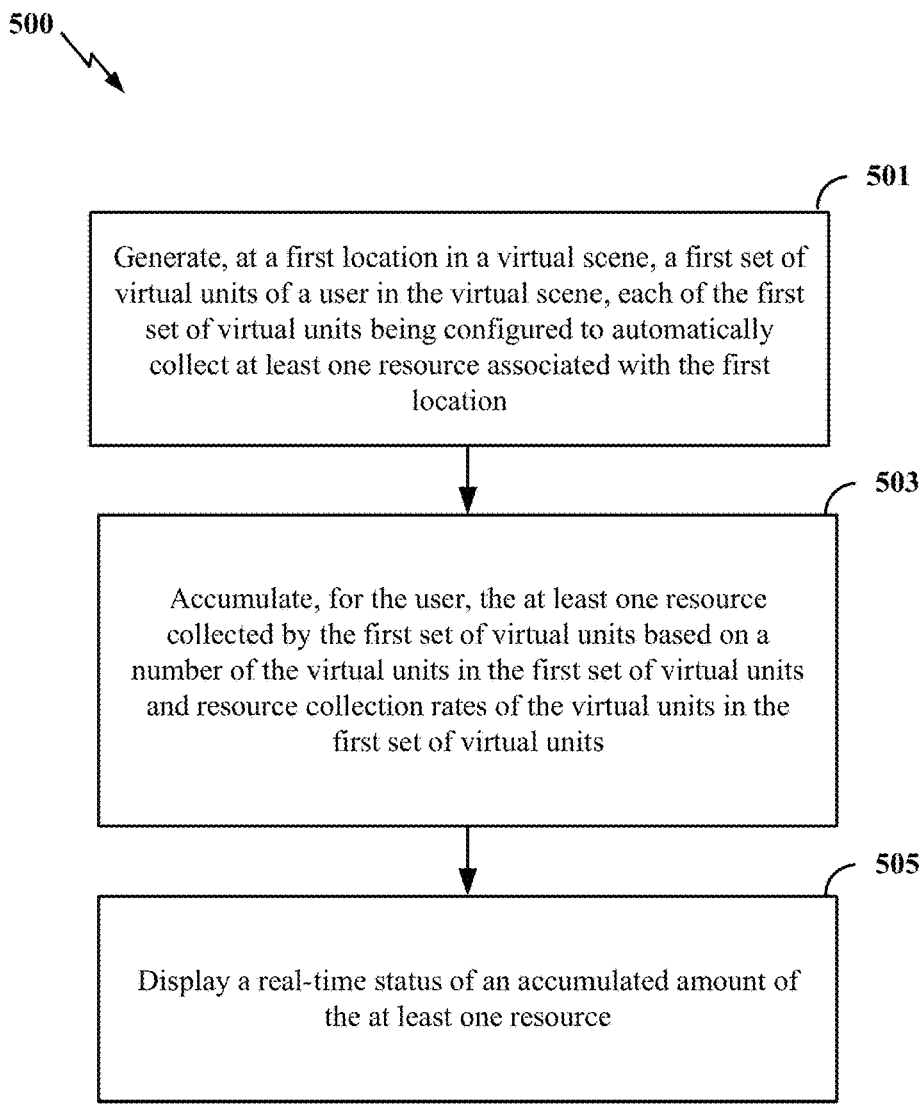

FIG. 5 illustrates a flowchart of various example methods of providing an automated worker system at a computing device in accordance with one or more techniques of this disclosure. The method 500 may be performed by an apparatus, such as the computing device 100, as described above. In some implementations, the method 500 is performed by processing logic, including hardware, firmware, software, or a combination thereof. In some implementations, the method 500 is performed by a processor executing code stored in a non-transitory computer-readable storage medium (e.g., a memory). The method 500 includes managing virtual units at a computing device.

At block 501, the method 500 may include generating, at a first location in a virtual scene, a first set of virtual units of a user in the virtual scene. Each of the first set of virtual units may be configured to automatically collect at least one resource associated with the first location, where a location of each of the first set of virtual units is fixed in the first location.

At block 503, the method 500 may include accumulating, for the user, the at least one resource collected by the first set of virtual units based on a number of the virtual units in the first set of virtual units and resource collection rates of the virtual units in the first set of virtual units.

At block 505, the method 500 may include displaying a real-time status of an accumulated amount of the at least one resource. As an example, referring to FIG. 2A, the global build menu 203 displays real-time information such as an accumulated amount of a first type of resource 210, an accumulated amount of a second type of resource 212, and a unit cap 213. As another example, referring to FIG. 3A, the global build menu 313 displays real-time information such as an accumulated amount of a first type of resource 312, an accumulated amount of a second type of resource 314, and a unit cap 316.

It is understood that the method illustrated by FIG. 5 is exemplary in nature and that the steps described herein may be combined or modified to generate alternative aspects.

Figure 6:
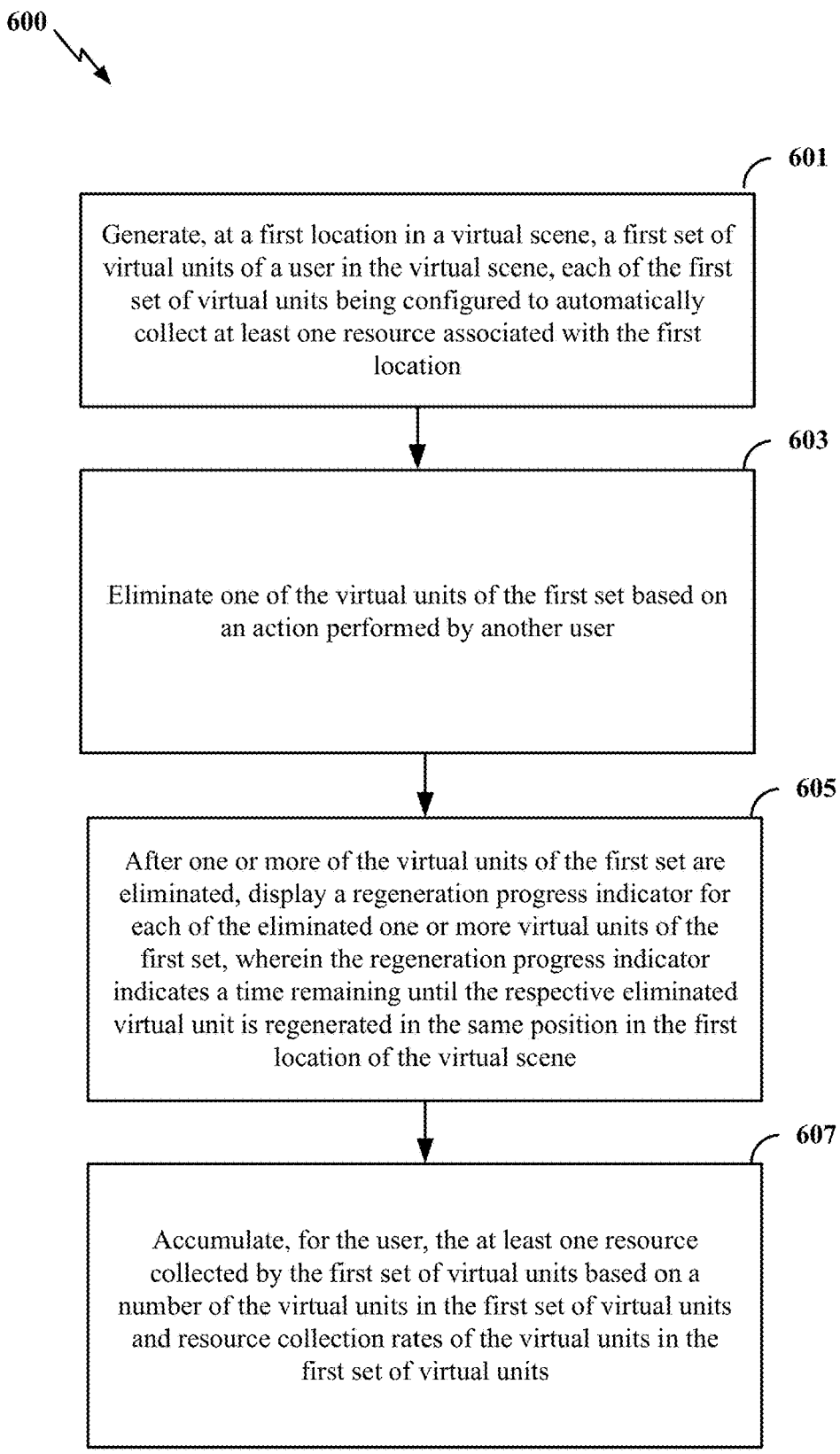

FIG. 6 illustrates a flowchart of various example methods of providing an automated worker system at a computing device in accordance with one or more techniques of this disclosure. The method 600 may be performed by an apparatus, such as the computing device 100, as described above. In some implementations, the method 600 is performed by processing logic, including hardware, firmware, software, or a combination thereof. In some implementations, the method 600 is performed by a processor executing code stored in a non-transitory computer-readable storage medium (e.g., a memory). The method 600 includes managing virtual units at a computing device.

At block 601, the method 600 may include generating, at a first location in a virtual scene, a first set of virtual units of a user in the virtual scene. Each of the first set of virtual units may be configured to automatically collect at least one resource associated with the first location, where a location of each of the first set of virtual units is fixed in the first location.

At block 603, the method 600 may include eliminating one of the virtual units of the first set based on an action performed by another user. As an example, referring to FIG. 2C, a fighter jet 220 belonging to an opponent has eliminated three virtual units from the first set of virtual units 208a by attacking the virtual units from the first set of virtual units 208a.

In some examples, the eliminated virtual unit automatically may regenerate in a same position in the first location of the virtual scene after a preset period of time. As an example, referring to FIG. 2D, the eliminated three virtual units from the first set of virtual units 208a are automatically regenerated in a same position in the first location of the virtual scene after a preset period of time.

At block 605, the method 600 may include, after one or more of the virtual units of the first set are eliminated, displaying a regeneration progress indicator for each of the eliminated one or more virtual units of the first set. The regeneration progress indicator may indicate a time remaining until the respective eliminated virtual unit is regenerated in the same position in the first location of the virtual scene. As an example, referring to FIG. 2C, a regeneration progress indicator 224 associated with eliminated virtual units from the first set of virtual units 208a indicates a time remaining until the respective eliminated virtual unit from the first set of virtual units 208a is regenerated in the same position in the first location of the virtual scene. In some examples, the generation of each virtual unit in the first set and the regeneration of each of the eliminated virtual units of the first set may not be associated with a resource cost, a supply cost, and a unit cap of the user.

At block 607, the method 600 may include, accumulating, for the user, the at least one resource collected by the first set of virtual units based on a number of the virtual units in the first set of virtual units and resource collection rates of the virtual units in the first set of virtual units.

It is understood that the method illustrated by FIG. 6 is exemplary in nature and that the steps described herein may be combined or modified to generate alternative aspects.

Figure 7:
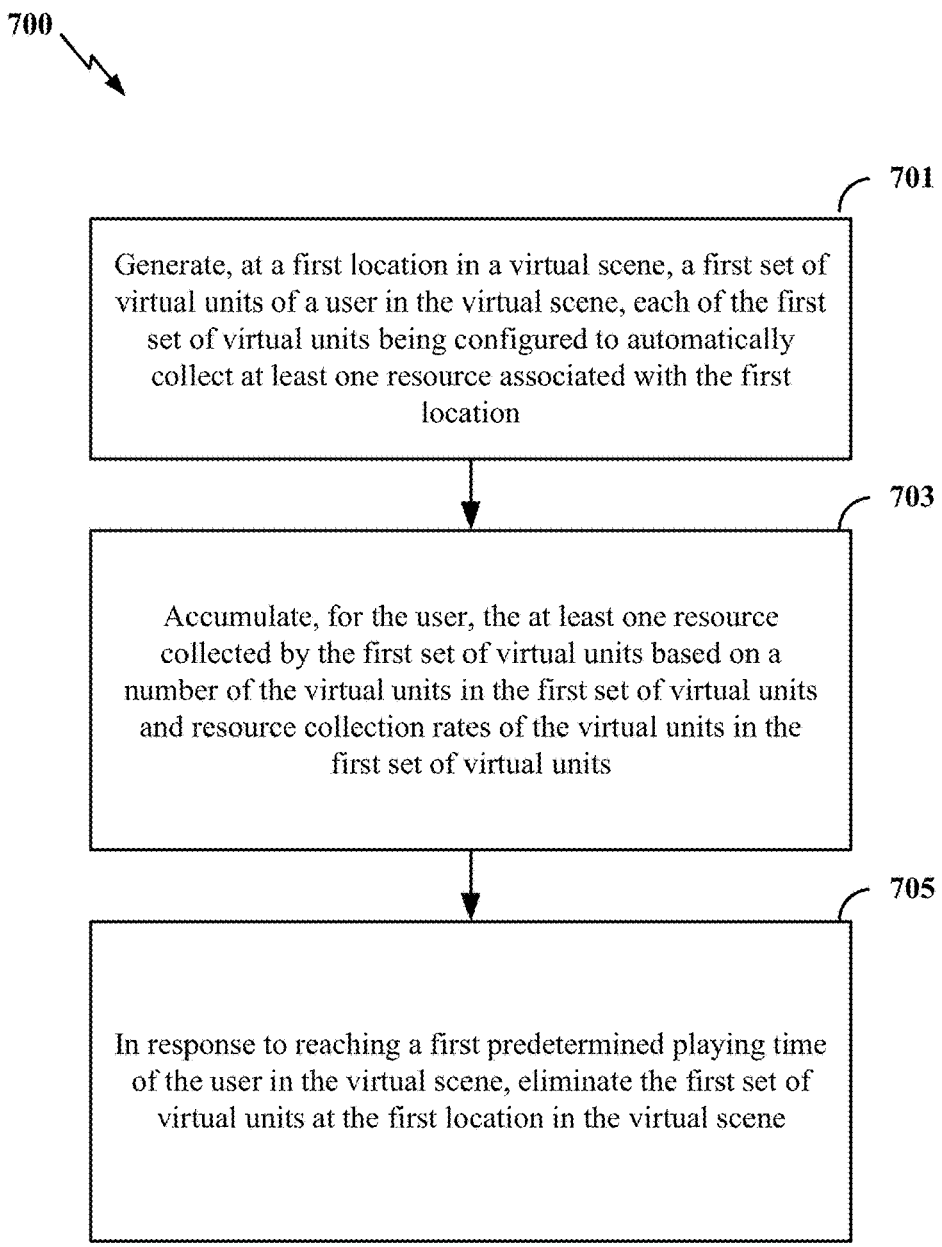

FIG. 7 illustrates a flowchart of various example methods of providing an automated worker system at a computing device in accordance with one or more techniques of this disclosure. The method 700 may be performed by an apparatus, such as the computing device 100, as described above. In some implementations, the method 700 is performed by processing logic, including hardware, firmware, software, or a combination thereof. In some implementations, the method 700 is performed by a processor executing code stored in a non-transitory computer-readable storage medium (e.g., a memory). The method 700 includes managing virtual units at a computing device.

At block 701, the method 700 may include generating, at a first location in a virtual scene, a first set of virtual units of a user in the virtual scene. Each of the first set of virtual units may be configured to automatically collect at least one resource associated with the first location, where a location of each of the first set of virtual units is fixed in the first location.

At block 703, the method 700 may include accumulating, for the user, the at least one resource collected by the first set of virtual units based on a number of the virtual units in the first set of virtual units and resource collection rates of the virtual units in the first set of virtual units.

At block 705, the method 700 may include, in response to reaching a first predetermined playing time of the user in the virtual scene, eliminating the first set of virtual units at the first location in the virtual scene. This acts as a warning to the users that the game is about to end and that users should prepare to make a final attack on the opponent (if they have not done so already).

It is understood that the method illustrated by FIG. 7 is exemplary in nature and that the steps described herein may be combined or modified to generate alternative aspects.

Figure 8:
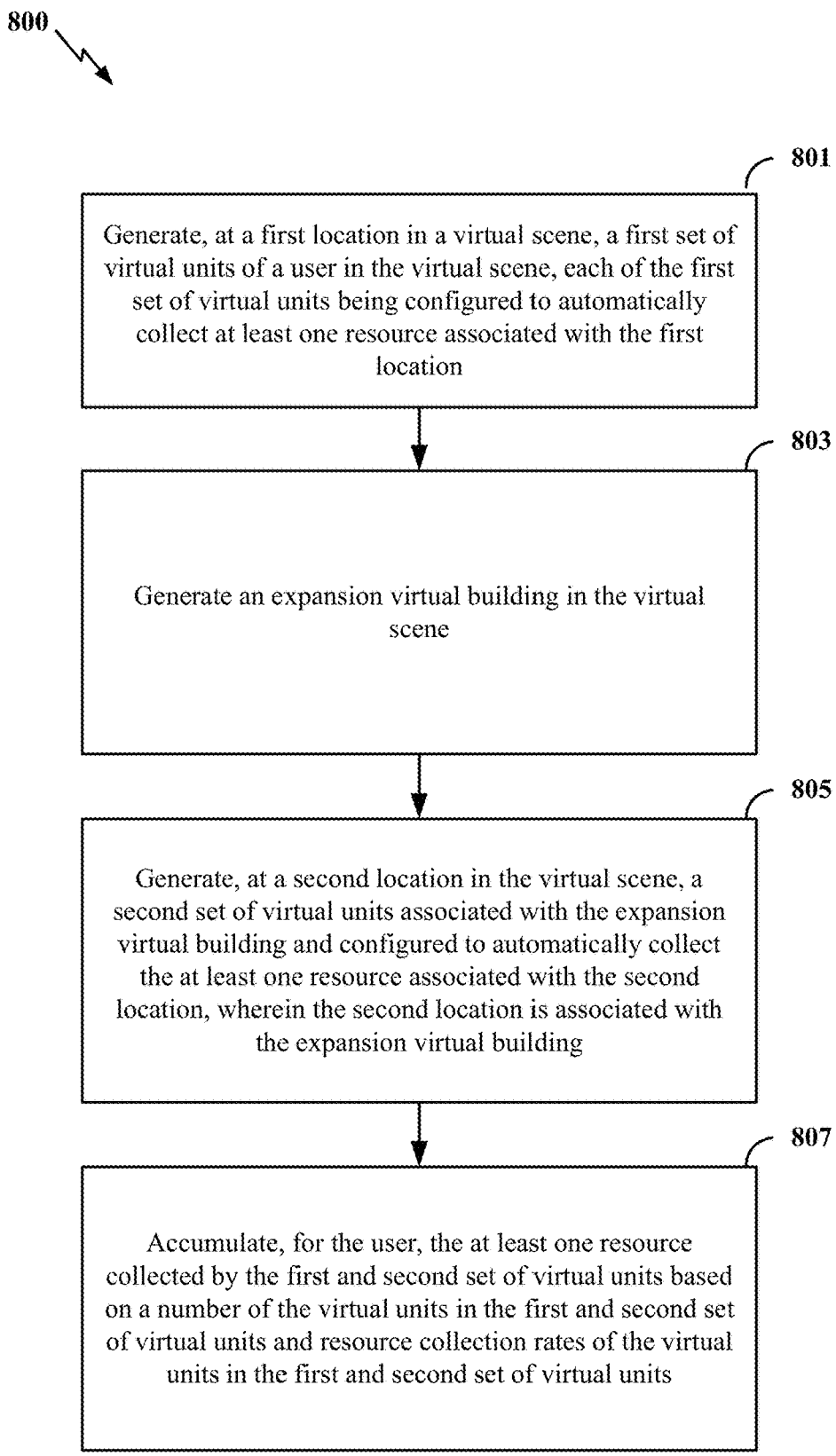

FIG. 8 illustrates a flowchart of various example methods of providing an automated worker system at a computing device in accordance with one or more techniques of this disclosure. The method 800 may be performed by an apparatus, such as the computing device 100, as described above. In some implementations, the method 800 is performed by processing logic, including hardware, firmware, software, or a combination thereof. In some implementations, the method 800 is performed by a processor executing code stored in a non-transitory computer-readable storage medium (e.g., a memory). The method 800 includes managing virtual units at a computing device.

At block 801, the method 800 may include generating, at a first location in a virtual scene, a first set of virtual units of a user in the virtual scene. Each of the first set of virtual units may be configured to automatically collect at least one resource associated with the first location, where a location of each of the first set of virtual units is fixed in the first location.

At block 803, the method 800 may include generating an expansion virtual building in the virtual scene. As an example, as shown in FIG. 3A, a user has initiated building an expansion base 306 and, as shown in the virtual scene 301*b* in FIG. 3B, the expansion base 306 has been completed.

Figure 3C:
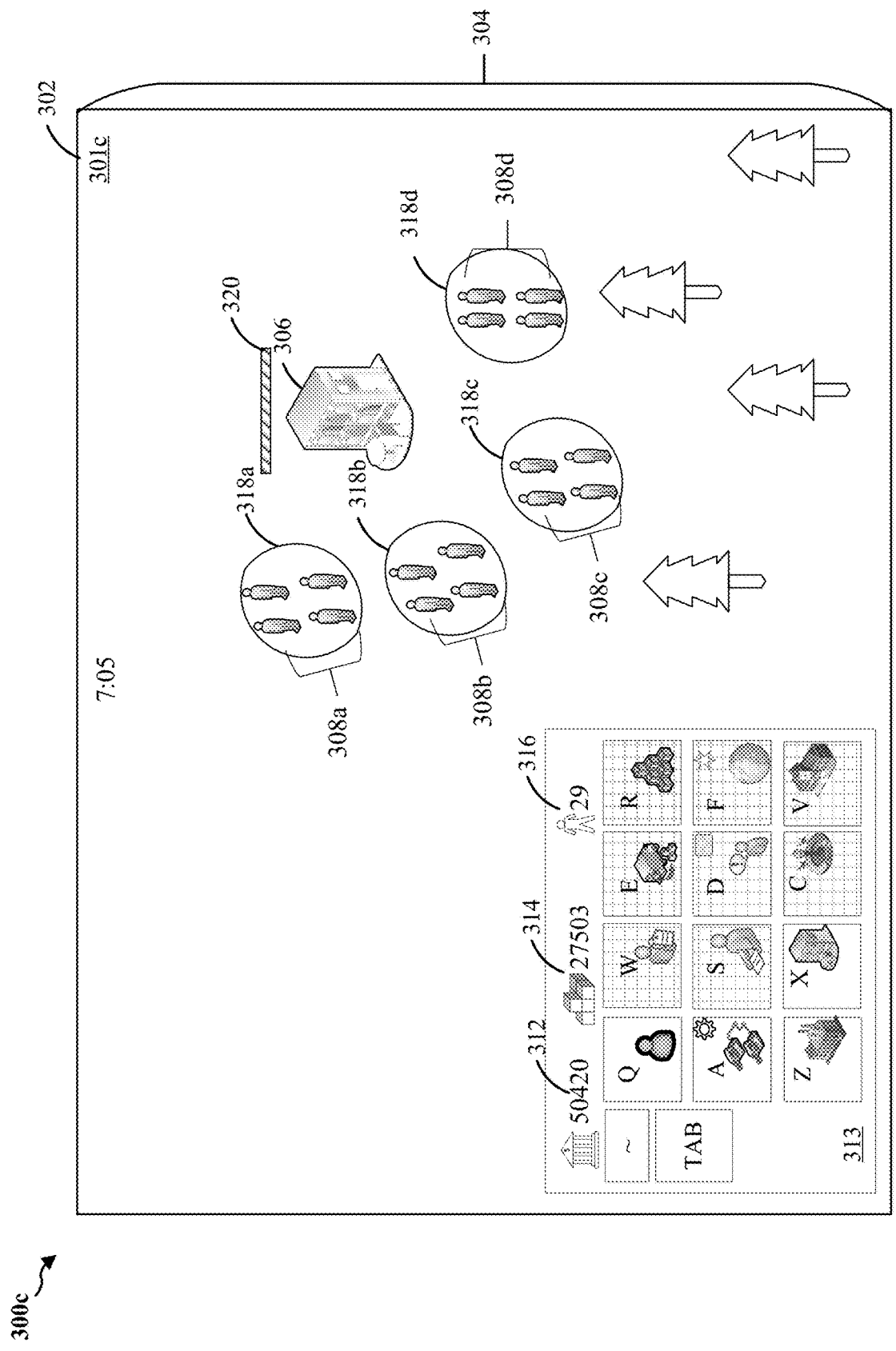

At block 805, the method 800 may include generating, at a second location in the virtual scene, a second set of virtual units associated with the expansion virtual building and configured to automatically collect the at least one resource associated with the second location, where the second location is associated with the expansion virtual building. As an example, as shown in FIG. 3C, virtual units from the second set of virtual units 308*a*, 308*b*, 308*c*, 308*d* are generated and configured to collect resources from the resource locations 318*a*, 318*b*, 318*c*, 318*d*. In addition, the virtual units from a second set of virtual units 308*a*, 308*b*, 308*c*, 308*d* and the resource locations 318*a*, 318*b*, 318*c*, 318*d* are both associated with the expansion base 306.

In some examples, the second set of virtual units may be generated after a second predetermined period of time has elapsed after the generation of the expansion virtual building in the virtual scene. As an example, as shown in the virtual scene 301*b* in FIG. 3B, once the expansion base 306 is completed, then virtual units from a second set of virtual units 308*a*, 308*b*, 308*c*, 308*d* will be generated after a second predetermined time period (e.g., 30 seconds).

In some examples, each of the virtual units in the second set may be configured to collect a first resource at a third resource collection rate, and where the method further comprises accumulating, for the user, the at least one resource collected by the second set of virtual units based on a number of the virtual units in the second set of virtual units and resource collection rates of the virtual units in the second set of virtual units. In some examples, each of the virtual units of the second set may be configured to collect a second resource associated with the second location at a fourth resource collection rate. As an example, as shown in FIG. 3C, virtual units from a second set of virtual units 308*a*, 308*b*, 308*c*, 308*d* collect a first type of resources at a third resource collection rate and a second type of resource at a fourth resource collection rate from the resource locations 318*a*, 318*b*, 318*c*, 318*d*. In some examples, the second set of virtual units may be generated after a second predetermined period of time has elapsed after the generation of the expansion virtual building in the virtual scene. As an example, as shown in FIG. 3A-3C, the second set of virtual units 308*a*, 308*b*, 308*c*, 308*d* are generated after a second predetermined period of time (e.g., 30 seconds) after the generation of the expansion base 306 in the virtual scene.

In some examples, a number of virtual units generated in the second set may be less than an amount of virtual units generated in the first set. As an example, as shown in FIG. 2A and FIG. 3C, the first set of virtual units 208*a*, 208*b*, 208*c*, 208*d* includes a total of 32 virtual units and the second set of virtual units 308*a*, 308*b*, 308*c*, 308*d* includes a total of 16 virtual units.

At block 807, the method 800 may include accumulating, for the user, the at least one resource collected by the second set of virtual units based on a number of the virtual units in the second set of virtual units and resource collection rates of the virtual units in the second set of virtual units. As an example, as shown in FIG. 3C, the first type of resource 312 and the second type of resource 314 are accumulated by the first and second set of virtual units based on a number of the virtual units in the first and second set of virtual units and resource collection rates of the virtual units in the first and second set of virtual units.

It is understood that the method illustrated by FIG. 8 is exemplary in nature and that the steps described herein may be combined or modified to generate alternative aspects.

Although the automated worker system is explained in the context of a RTS game, the subject matter described herein may be implemented across any game or process to provide a clear and vulnerable place to disrupt an opponent's economy by attacking an opponent's "economy" units and buildings. As an example, the automated worker system may be implemented in a turn-based strategy game or any other game that includes an active resource management system.

The subject matter described herein can be implemented to realize one or more benefits. For instance, the techniques disclosed herein enable a method of making RTS games more accessible to casual gamers and non-gamers by removing and automating difficult and tedious tasks involved with resource gathering units and resource management. The method of managing virtual units by generating a first set of virtual units configured to automatically collect at least one resource associated with the first location provides an automated worker system that automates functions related to the workers. The workers automatically gather resources when alive, workers are automatically generated when a new base is built, workers cost no resources or supply to build, and workers automatically regenerate themselves when killed. This allows users to focus on more exciting parts of an RTS game such as unit construction, strategizing what counters to build and when to build the counters, when to expand, when to harass enemy workers, and when to attack enemy forces. The automated worker system still preserves the benefits and fun of having a workers based resourcing system and resource management strategy. Thus, the automated worker system allows for a much more fun experience where users do not need to perform boring and tedious tasks of resource management and controlling and monitoring worker virtual units. Instead, users can focus on more exciting portions of the game such as creating more action points early in the game while still maintaining the ability to disrupt an enemy's economy by attacking enemy workers.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing unit may be implemented in hardware (e.g., by processing circuitry), software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware.

What is claimed is:

1. A method for managing virtual units, the method comprising:
    generating, at a first location in a virtual scene, a first set of virtual units of a user in the virtual scene, each of the first set of virtual units being configured to automatically collect at least one resource associated with the first location, wherein a location of each of the first set of virtual units is immobile in the first location;
    accumulating, for the user, the at least one resource collected by the first set of virtual units based on a number of the virtual units in the first set of virtual units and resource collection rates of the virtual units in the first set of virtual units; and
    eliminating one of the virtual units of the first set based on an action performed by another user, wherein
    each of the first set of virtual units cannot be controlled by the user, and
    the eliminated virtual unit automatically regenerates in a same position in the first location of the virtual scene after a preset period of time.

2. The method according to claim 1, wherein the first set of virtual units is generated in association with generation of a core building of the user in the virtual scene, wherein the first location is associated with the core building.

3. The method according to claim 1, wherein the first set of virtual units is generated at a start of a round in the virtual scene.

4. The method according to claim 1, wherein each of the virtual units in the first set is configured to collect a first resource at a first resource collection rate.

5. The method according to claim 4, wherein each of the virtual units in the first set is further configured to collect a second resource associated with the first location at a second resource collection rate.

6. The method according to claim 5, wherein each of the virtual units in the first set is further configured to simultaneously collect the first resource at the first resource collection rate and the second resource at the second resource collection rate.

7. The method according to claim 1, further comprising:
    after one or more of the virtual units of the first set are eliminated, displaying a regeneration progress indicator for each of the eliminated one or more virtual units of the first set, wherein the regeneration progress indicator indicates a time remaining until the respective eliminated virtual unit is regenerated in the same position in the first location of the virtual scene.

8. The method according to claim 1, wherein the generation of each virtual unit in the first set and the regeneration of each of the eliminated virtual units of the first set is not associated with a resource cost, a supply cost, and a unit cap of the user.

9. The method according to claim 1, further comprising displaying a real-time status of an accumulated amount of the at least one resource.

10. The method according to claim 1, further comprising, in response to reaching a first predetermined playing time of the user in the virtual scene, eliminating the first set of virtual units at the first location in the virtual scene.

11. The method according to claim 1, further comprising:
    generating an expansion virtual building in the virtual scene; and
    generating, at a second location in the virtual scene, a second set of virtual units associated with the expansion virtual building and configured to automatically collect the at least one resource associated with the second location, wherein the second location is associated with the expansion virtual building.

12. The method according to claim 11, wherein each of the virtual units in the second set is configured to collect a first resource at a third resource collection rate, and further comprising accumulating, for the user, the at least one resource collected by the second set of virtual units based on a number of the virtual units in the second set of virtual units and resource collection rates of the virtual units in the second set of virtual units.

13. The method according to claim 11, wherein each of the virtual units of the second set is configured to collect a second resource associated with the second location at a fourth resource collection rate.

14. The method according to claim 11, wherein the second set of virtual units is generated after a second predetermined period of time has elapsed after the generation of the expansion virtual building in the virtual scene.

15. The method according to claim 1, wherein each of the first set of virtual units are not generated based on a user command.

16. An apparatus for managing virtual units, the apparatus comprising:
processing circuitry configured to:
generate, at a first location in a virtual scene, a first set of virtual units of a user in the virtual scene, each of the first set of virtual units being configured to automatically collect at least one resource associated with the first location, wherein a location of each of the first set of virtual units is immobile in the first location;
accumulate, for the user, the at least one resource collected by the first set of virtual units based on a number of the virtual units in the first set of virtual units and resource collection rates of the virtual units in the first set of virtual units; and
eliminate one of the virtual units of the first set based on an action performed by another user, wherein
each of the first set of virtual units cannot be controlled by the user, and
the eliminated virtual unit automatically regenerates in a same position in the first location of the virtual scene after a preset period of time.

17. A non-transitory computer-readable storage medium storing computer-readable instructions thereon, which, when executed by processing circuitry, cause the processing circuitry to perform a method for managing virtual units, the method comprising:
generating, at a first location in a virtual scene, a first set of virtual units of a user in the virtual scene, each of the first set of virtual units being configured to automatically collect at least one resource associated with the first location, wherein a location of each of the first set of virtual units is immobile in the first location;
accumulating, for the user, the at least one resource collected by the first set of virtual units based on a number of the virtual units in the first set of virtual units and resource collection rates of the virtual units in the first set of virtual units; and
eliminating one of the virtual units of the first set based on an action performed by another user, wherein
each of the first set of virtual units cannot be controlled by the user, and
the eliminated virtual unit automatically regenerates in a same position in the first location of the virtual scene after a preset period of time.

* * * * *